United States Patent
Sakuta et al.

(10) Patent No.: US 10,829,504 B2
(45) Date of Patent: Nov. 10, 2020

(54) ISOCYANIDE COMPOUND AND HYDROSILYLATION REACTION CATALYST

(71) Applicants: SHIN-ETSU CHEMICAL CO., LTD., Tokyo (JP); KYUSHU UNIVERSITY, NATIONAL UNIVERSITY CORPORATION, Fukuoka-shi, Fukuoka (JP)

(72) Inventors: Koji Sakuta, Annaka (JP); Hideo Nagashima, Fukuoka (JP); Yusuke Sunada, Fukuoka (JP); Daisuke Noda, Fukuoka (JP)

(73) Assignees: SHIN-ETSU CHEMICAL CO., LTD., Tokyo (JP); KYUSHU UNIVERSITY, NATIONAL UNIVERSITY CORPORATION, Fukuoka (JP)

(*) Notice: Subject to any disclaimer, the term of this patent is extended or adjusted under 35 U.S.C. 154(b) by 192 days.

(21) Appl. No.: 16/071,850

(22) PCT Filed: Jan. 18, 2017

(86) PCT No.: PCT/JP2017/001580
§ 371 (c)(1),
(2) Date: Jul. 20, 2018

(87) PCT Pub. No.: WO2017/126562
PCT Pub. Date: Jul. 27, 2017

(65) Prior Publication Data
US 2020/0165274 A1 May 28, 2020

(30) Foreign Application Priority Data

Jan. 22, 2016 (JP) ................................ 2016-010253

(51) Int. Cl.
| C07F 7/08 | (2006.01) |
| C07F 7/21 | (2006.01) |
| C08G 77/38 | (2006.01) |
| B01J 31/02 | (2006.01) |
| C08G 77/08 | (2006.01) |

(52) U.S. Cl.
CPC ......... *C07F 7/0838* (2013.01); *B01J 31/0252* (2013.01); *C07F 7/081* (2013.01); *C07F 7/0805* (2013.01); *C07F 7/0879* (2013.01); *C07F 7/21* (2013.01); *C08G 77/38* (2013.01); *B01J 2231/323* (2013.01); *B01J 2531/821* (2013.01); *B01J 2531/824* (2013.01); *B01J 2531/842* (2013.01); *B01J 2531/845* (2013.01); *C08G 77/08* (2013.01)

(58) Field of Classification Search
None
See application file for complete search history.

(56) References Cited

U.S. PATENT DOCUMENTS

| 4,946,818 | A | 8/1990 | Lewis |
| 5,128,431 | A | 7/1992 | Riding et al. |
| 5,273,946 | A | 12/1993 | Armstrong |
| 5,426,200 | A | 6/1995 | Dauth et al. |
| 5,523,436 | A | 6/1996 | Dauth et al. |
| 6,303,728 | B1 | 10/2001 | Hagimori et al. |
| 6,492,525 | B1 | 12/2002 | Bertrand et al. |
| 6,803,440 | B2 | 10/2004 | Marko et al. |
| 7,563,741 | B2 | 7/2009 | Brummer et al. |
| 7,803,893 | B2 | 9/2010 | Hofmann et al. |
| 8,124,711 | B2 | 2/2012 | Hofmann et al. |
| 8,236,915 | B2 | 8/2012 | Delis et al. |
| 8,415,443 | B2 | 4/2013 | Delis et al. |
| 9,480,977 | B2 | 11/2016 | Brandstadt et al. |
| 9,545,624 | B2 | 1/2017 | Brandstadt et al. |
| 2018/0200703 | A1* | 7/2018 | Nagashima ............. B01J 31/22 |

FOREIGN PATENT DOCUMENTS

| JP | 1-315344 A | 12/1989 |
| JP | 6-136126 A | 5/1994 |
| JP | 6-263780 A | 9/1994 |
| JP | 7-149780 A | 6/1995 |
| JP | 11-271521 A | 10/1999 |
| JP | 2001-131231 A | 5/2001 |
| JP | 3174616 B2 | 6/2001 |

(Continued)

OTHER PUBLICATIONS

Adams et al., "The Catalytic Activity of Transition Metal Complexes of Sterically Hindered Isocyanides", Journal of Molecular Catalysis, 1985, vol. 29, pp. 201-208.

Anga et al., "Titanium and zirconium complexes of the N,N'-bis(2,6-diisopropylphenyl)-1,4-diaza-butadiene ligand: syntheses, structures and uses in catalytic hydrosilylation reactions", Dalton Trans., 2014, vol. 43, pp. 14876-14888.

Bai et al., "Application of polyethyleneglycol (PEG) functionalized ionic liquids for the rhodium-catalyzed hydrosilylation reaction of alkenes", Journal of Organometallic Chemistry, 2015, vol. 794, pp. 65-69.

Bart et al., Preparation and Molecular and Electronic Structures of Iron(0) Dinitrogen and Silane Complexes and Their Application to Catalytic Hydrogenation and Hydrosilation, J. Am. Chem. Soc., 2004, vol. 126, pp. 13794-13807.

(Continued)

*Primary Examiner* — Marc S Zimmer
(74) *Attorney, Agent, or Firm* — Birch, Stewart, Kolasch & Birch, LLP

(57) ABSTRACT

Provided are a novel isocyanide compound, a hydrosilylation reaction catalyst having excellent handling properties and storage properties that allows a hydrosilylation reaction to proceed under moderate conditions by using the isocyanide compound, and a method for producing an addition compound by a hydrosilylation reaction using the hydrosilylation reaction catalyst.

A hydrosilylation reaction catalyst prepared from a catalyst precursor comprising a transition metal compound of groups 8, 9, or 10 of the periodic table, excluding platinum, such as an iron carboxylate, cobalt carboxylate, or nickel carboxylate, and a ligand comprising an isocyanide compound having an organosiloxane group.

21 Claims, No Drawings

(56) References Cited

FOREIGN PATENT DOCUMENTS

| | | |
|---|---|---|
| JP | 3599669 B2 | 12/2004 |
| JP | 3854151 B2 | 12/2006 |
| JP | 4007467 B2 | 11/2007 |
| JP | 4249702 B2 | 4/2009 |
| JP | 4934190 B2 | 5/2012 |
| JP | 5032561 B2 | 9/2012 |
| JP | 2012-532884 A | 12/2012 |
| JP | 2012-532885 A | 12/2012 |
| JP | 2013-544824 A | 12/2013 |
| JP | 2014-502271 A | 1/2014 |
| JP | 2014-503507 A | 2/2014 |
| WO | WO 2010/016416 A1 | 2/2010 |
| WO | WO 2012/071358 A2 | 5/2012 |
| WO | WO 2012/071359 A1 | 5/2012 |
| WO | WO 2012/071360 A1 | 5/2012 |
| WO | WO 2013/043783 A2 | 3/2013 |
| WO | WO 2013/043785 A2 | 3/2013 |
| WO | WO 2013/043787 A2 | 3/2013 |
| WO | WO 2013/043846 A1 | 3/2013 |
| WO | WO 2013/043912 A2 | 3/2013 |
| WO | WO 2013/081794 A1 | 6/2013 |
| WO | WO 2014/021908 A1 | 2/2014 |
| WO | WO 2017/010366 A1 * | 1/2017 |

OTHER PUBLICATIONS

Brookhart et al., "Mechanism of a Cobalt(III)-Catalyzed Olefin Hydrosilation Reaction: Direct Evidence for a Silyl Migration Pathway", J. Am. Chem. Soc., 1993, vol. 115, No. 6, pp. 2151-2156.

Buslov et al., "Chemoselective Alkene Hydrosilylation Catalyzed by Nickel Pincer Complexes", Angew. Chem. Int. Ed., 2015, vol. 54, pp. 14523-14526, in press (DOI:10.1002/anie.201507829).

Chalk et al., "Dicobalt Octacarbonyl as a Catalyst for Hydrosilation of Olefins", J. Am. Chem. Soc., 1965, vol. 87, No. 16, p. 1133.

Chalk et al., "Homogeneous Catalysis. IV. Some Reactions of Silicon Hydrides in the Presence of Cobalt Carbonyls", Journal of the American Chemical Society, Mar. 29, 1967, vol. 89, No. 7, pp. 1640-1647.

Chalk, "The Hydrosilation of Olefins Catalyzed by Some Rhodium and Cobalt Complexes", Journal of Organometallic Chemistry, 1970, vol. 21, pp. 207-213.

Chatani et al., "The $Co_2(CO)_8$-Catalyzed Hydrosilylation of Oxygen-Containing Olefins: Silylmetalation as a Key Step", Chemistry Letters, 2000, pp. 14-15.

Chen et al., "Iron-Catalyzed Asymmetric Hydrosilylation of 1,1-Disubstituted Alkenes", Angew. Chem. Int. Ed., 2015, vol. 54, pp. 4661-4664.

Chen et al., "Rapid, Regioconvergent, Solvent-Free Alkene Hydrosilylation with a Cobalt Catalyst", Journal of The American Chemical Society, 2015, vol. 137, pp. 13244-13247, in press (DOI:10.1021/jacs.5b08611).

Cornish et al., "Homogeneous Catalysis VI. Hydrosilylation Using Tris(Pentanedionato)Rhodium(III) or Tetrakis(μ-Acetato)Dirhodium(II) As Catalyst", Journal of Organometallic Chemistry, 1979, vol. 172, pp. 153-163.

Haque et al., "Synthesis, Characterization, Crystal Structures, and Catalytic C—C Coupling and Hydrosilylation Reactions of Palladium(II) Complexes Derived from CNC Pincer-Type N-Heterocyclic Carbenes", Eur. J. Inorg. Chem., 2015, pp. 3169-3181.

Hill et al., "Rhodium Carbene Complexes As Hydrosilylation Catalysts", Journal of Organometallic Chemistry, 1977, vol. 137, pp. 293-300.

Hyder et al., "Oligomerization and regioselective hydrosilylation of styrenes catalyzed by cationic allyl nickel complexes bearing allylphosphine ligands", Dalton Trans., 2007, pp. 3000-3009.

Imlinger et al., "Rh(1,3-bis(2,4,6-trimethylphenyl)-3,4,5,6-tetrahydropyrimidin-2-ylidene)(COD) tetrafluoroborate, an unsymmetrical Rh-homoazallylcarbene: synthesis, X-ray structure and reactivity in carbonyl arylation and hydrosilylation reactions", Journal of Organometallic Chemistry, 2005, vol. 690, pp. 4433-4440.

International Search Report for PCT/JP2017/001580 dated Apr. 11, 2017.

Junquera et al., "R-Allyl Nickel(II) Complexes with Chelating N-Heterocyclic Carbenes: Synthesis, Structural Characterization, and Catalytic Activity", Organometallic, 2012, vol. 31, pp. 2175-2183.

Kakiuchi et al., "Completely selective synthesis of (E)-β-(triethylsilyl)styrenes by $Fe_3(CO)_{12}$ -catalyzed reaction of styrenes with triethylsilane", Journal of Organometallic Chemistry, 1993, vol. 456, pp. 45-47.

Kamata et al., "Catalytic Hydrosilylation of Alkenes by Iron Complexes Containing Terpyridine Derivatives as Ancillary Ligands", Organometallics, 2012, vol. 31, pp. 3825-3828.

Kercher et al., "Stereocontrolled Synthesis of 5-Acyl-3,4-dihydro-2H-pyrroles and Related Heterocycles via Intramolecular 2-Propylidene-1,3-bis(silane)-Acylnitrilium Ion Cyclizations", J. Org. Chem., 1997, vol. 62, No. 4, pp. 805-812.

King et al., "Studies on Poly(iminomethylenes)", Journal of Polymer Science: Part A: Polymer Chemistry, 1987, vol. 25, pp. 907-918.

Kiso et al., "Silicon Hydrides and Nickel Complexes I. Phosphine-Nickel(II) Complexes As Hydrosilylation Catalysts", Journal of Organometallic Chemistry, 1973, vol. 50, pp. 297-310.

Kotha et al., "Synthesis and reactions of silicon containing cyclic α-amino acid derivatives", Journal of Organometallic Chemistry, 2004, vol. 689, pp. 158-163.

Li et al., "Synthesis of rhodium N-heterocyclic carbene complexes and their catalytic activity in the hydrosilylation of alkenes in ionic liquid medium", Journal of Organometallic Chemistry, 2011, vol. 696, pp. 2116-2121.

Lipschutz et al., "Synthesis and reactivity of a conveniently prepared two-coordinate bis(amido) nickel(II) complex", Chem. Commun., 2012, vol. 48, pp. 7146-7148.

Maciejewski et al., "Catalysis of hydrosilylation Part XXXIV. High catalytic efficiency of the nickel equivalent of Karstedt catalyst [{Ni(η-$CH_2$=$CHSiMe_2$)$_2$O}$_2$ {μ-(η-$CH_2$=$CHSiMe_2$)$_2$O}]", Journal of Organometallic Chemistry, 2000, vol. 597, pp. 175-181.

Magnus et al., "Studies on the Synthesis of the Antitumor Agent CC-1065. Synthesis of the Unprotected Cyclopropapyrroloindole A Portion Using the 3 3'-Bipyrrole Strategy", J. Am. Chem. Soc,. 1987, vol. 109, No. 9, pp. 2706-2711.

Magomedov et al., "Hydrosilylation of Olefins in the Presence of Metal Carbonyls", Journal of Organometallic Chemistry, 1978, vol. 149, pp. 29-36.

Mo et al., "Anchoring of Silyl Donors on a N-Heterocyclic Carbene through the Cobalt-Mediated Silylation of Benzylic C—H Bonds", Angew. Chem. Int. Ed., 2013, vol. 52, pp. 10845-10849.

Naumov et al., "Selective Dehydrogenative Silylation-Hydrogenation Reaction of Divinyldisiloxane with Hydrosilane Catalyzed by an Iron Complex", Journal of the American Chemical Society, 2012, vol. 134, pp. 804-807.

Nesmeyanov et al., "Addition, Substitution, and Telomerization Reactions of Olefins in the Presence of Metal Carbonyls or Colloidal Iron", Tetrahedron, 1962, vol. 17, pp. 61-68.

Reichel et al., "Photochemistry of Cobalt Carbonyl Complexes Having a Cobalt-Silicon Bond and Its Importance in Activation of Catalysis", Inorganic Chemistry, 1980, vol. 19, No. 12, pp. 3858-3860.

Schöllkopf et al., "Synthesen mit α-metallierten Isocyaniden, XXXVII. 1-Lithio-1-alkenylisocyanide und ihre Umsetzung mit Elektrophilen", Liebigs Ann. Chem., 1977, vol. 1977, pp. 1167-1173.

Schroeder et al., "Pentacarbonyliron(0) Photocatalyzed Reactions of Trialkylsilanes With Alkenes", Journal of Organometallic Chemistry, 1977, vol. 128, pp. 345-358.

Steiman et al., "Reversible Substrate Activation and Catalysis at an Intact Metal-Metal Bond Using a Redox-Active Supporting Ligand", Journal of the American Chemical Society, 2015, vol. 137, pp. 6104-6110.

(56) References Cited

OTHER PUBLICATIONS

Takeshita et al., "The Catalyzed Reaction of α,β-Unsaturated Esters with Various Hydrosilanes", J. Org. Chem., 1987, vol. 52, pp. 4864-4868.

Tondreau et al., "Iron Catalysts for Selective Anti-Markovnikov Alkene Hydrosilylation Using Tertiary Silanes", Science, Feb. 3, 2012, vol. 335, pp. 567-570.

Tondreau et al., "Synthesis, Electronic Structure, and Alkene Hydrosilylation Activity of Terpyridine and Bis(imino)pyridine Iron Dialkyl Complexes", Organometallics, 2012, vol. 31, pp. 4886-4893.

Truscott et al., "Well-defined NHC-rhodium hydroxide complexes as alkene hydrosilylation and dehydrogenative silylation catalysts", Dalton Transactions, 2013, vol. 42, pp. 270-276.

Written Opinion of the International Searching Authority for PCT/JP2017/001580 (PCT/ISA/237) dated Apr. 11, 2017.

Xue et al., "Effect of triarylphosphane ligands on the rhodium-catalyzed hydrosilylation of alkene", Appl. Organometal. Chem., 2014, vol. 28, pp. 120-126.

\* cited by examiner

ISOCYANIDE COMPOUND AND HYDROSILYLATION REACTION CATALYST

TECHNICAL FIELD

This invention relates to a novel isocyanide compound useful in forming a hydrosilylation reaction catalyst, and a hydrosilylation reaction catalyst using the compound as a ligand; and more particularly, to a hydrosilylation reaction catalyst formed from a metal compound serving as a catalyst precursor and a novel isocyanide compound serving as a ligand component. It also relates to a method for preparing an addition compound via hydrosilylation reaction using the catalyst.

BACKGROUND ART

Hydrosilylation reaction which is addition reaction of a Si—H functional compound to a compound having a carbon-carbon double bond or triple bond is a useful means for the synthesis of organosilicon compounds and an industrially important synthesis reaction.

As the catalyst for hydrosilylation reaction, Pt, Pd and Rh compounds are known. Among others, Pt compounds as typified by Speier catalyst and Karstedt catalyst are most commonly used.

While several problems arise with reaction in the presence of Pt compounds as the catalyst, one problem is that upon addition of a Si—H functional compound to terminal olefin, a side reaction due to internal rearrangement of olefin takes place. Since this system does not exert addition reactivity to the internal olefin, unreacted olefin is left in the addition product. To drive the reaction to completion, it is necessary to use an excess amount of olefin in advance by taking into account the fraction left as a result of side reaction.

Another problem is that the selectivity of α- and β-adducts is low depending on the type of olefin.

The most serious problem is that all the center metals Pt, Pd and Rh are quite expensive noble metal elements. Since metal compound catalysts which can be used at lower cost are desired, a number of research works have been made thereon.

For example, reaction in the presence of iron-carbonyl complexes ($Fe(CO)_5$, $Fe_3(CO)_{12}$) is known from Non-Patent Document 1, although this reaction requires reaction conditions including as high a temperature as 160° C. or light irradiation (Non-Patent Document 2).

For these iron-carbonyl complexes, it is reported in Non-Patent Document 3 and Patent Document 1 that dehydrogenation silylated products are obtained rather than the addition reaction.

Also Non-Patent Document 4 and Patent Document 2 report a reaction of methylvinyldisiloxane and methylhydrogendisiloxane in the presence of an iron-carbonyl complex coordinated with a cyclopentadienyl group. Since dehydrogenation silylation reaction takes place along with the relevant reaction, the selectivity of addition reaction is low.

Non-Patent Document 5 refers to reaction in the presence of an iron catalyst having a terpyridine ligand. A large excess of reducing agent ($NaBHEt_3$) is necessary as a reaction aid. Although $PhSiH_3$ and $Ph_2SiH_2$ add to olefins, more useful trialkylsilanes, alkoxysilanes and siloxanes have poor addition reactivity to olefins.

Non-Patent Document 6 reports that from reaction in the presence of an iron catalyst having a terpyridine ligand and a bistrimethylsilylmethyl group, an addition reaction product is obtained in high yields. This method needs some steps until the catalyst is synthesized, including first synthesizing a terpyridine-iron complex as a catalyst precursor and introducing a bistrimethylsilylmethyl group therein at a low temperature, which steps are not easy industrially.

Also, Non-Patent Documents 7 and 8 report iron complexes having a bisiminopyridine ligand. It is disclosed that they exhibit high reactivity to alkoxysilanes and siloxanes under mild conditions.

The reaction using the complex, however, suffers from several problems including low reactivity with internal olefin, the use of sodium amalgam consisting of water-prohibitive sodium and highly toxic mercury and requiring careful handling for complex synthesis (or the use of water-prohibitive $NaBEt_3H$), low stability of the complex compound itself, a need for a special equipment like a glove box for handling, and a need for storage in an inert gas atmosphere such as nitrogen at low temperature.

Non-Patent Document 9 reports an iron complex having a chiral iminopyridineoxazoline ligand and describes an exemplary reaction of tertiary alkene with $Ph_2SiH_2$. However, a reducing agent ($NaBHEt_3$) is necessary, and dihydrodiphenylsilane is not a reaction substrate of industrial great worth.

Non-Patent Documents 10 to 15 report examples of reaction in the presence of cobalt-carbonyl complexes (e.g., $Co_2(CO)_8$), but they are unsatisfactory in reaction yield and reaction molar ratio. No reference is made to addition reactivity to siloxanes.

Also an example of reaction of olefin with trialkylsilane in the presence of a cobalt-carbonyl complex substituted with a trialkylsilyl group is reported in Non-Patent Document 16, but the yield is low and the selectivity is low.

Non-Patent Document 17 reports reaction of olefin with trialkylsilane in the presence of a cobalt-phosphite complex coordinated with a cyclopentadienyl group, and Non-Patent Document 18 reports reaction of olefin with trihydrophenylsilane in the presence of a cobalt complex coordinated with N-heterocyclic carbene. Because of low stability, these complex compounds require a special equipment like a glove box for handling and an inert gas atmosphere and a low temperature for storage.

Non-Patent Document 19 reports an exemplary reaction in the presence of a cobalt catalyst coordinated with a β-diketiminate group. The reaction substrate is trihydrophenylsilane which is of low industrial utility value.

An exemplary reaction of 1-hexene with triethoxysilane is also shown, but the reaction requires a catalyst amount of 2 mol % because of low catalytic activity.

Also the catalyst or complex compound is less stable and not easy to handle.

Patent Documents 3 to 6 report iron, cobalt and nickel catalysts having terpyridine, bisiminopyridine and bisiminoquinoline ligands. Like the above-cited Non-Patent Documents 6 to 8, there are problems including industrial difficulty of synthesis of a catalyst precursor or synthesis of the complex catalyst from the precursor, low stability of the complex compound itself, and a need for a special equipment for handling.

Also Patent Document 7 discloses a method of conducting reaction in the presence of a complex catalyst having a bisiminoquinoline ligand, using Mg(butadiene).2THF or $NaEt_3BH$ as the catalyst activator. There arise the same problems as above, and the yield of the desired product is less than satisfactory.

Many examples of the nickel complex catalyst are reported. For example, a catalyst having a phosphine ligand (Non-Patent Document 20) lacks in selectivity and requires careful handling and storage.

With a vinylsiloxane-coordinated catalyst (Non-Patent Document 21), a dehydrogenation silylated product becomes predominant, indicating low selectivity of addition reaction.

With an allylphosphine-coordinated catalyst (Non-Patent Document 22), the yield is low, and trihydrophenylsilane is not a reaction substrate of industrial worth.

A bisamide-bearing catalyst (Non-Patent Document 23) needs careful handling and storage, and dihydrodiphenylsilane is not a reaction substrate of industrial worth.

A catalyst having N-heterocyclocarbene ligand (Non-Patent Document 24) has low selectivity of reaction, and trihydrophenylsilane is not of industrial worth.

Non-Patent Document 25 reports examples of nickel alkoxide catalyst having a pincer type bisaminoamine ligand, but refers to only dihydrodiphenylsilane as the reaction substrate.

Non-Patent Document 26 describes an exemplary nickel binuclear complex having a naphthylidine diimine ligand, which is used in a catalyst amount of 5 mol %, indicating low catalytic activity. The reaction substrate is dihydrodiphenylsilane, which is of low industrial value. In addition, the complex compound is less stable and not easy to handle.

As to titanium and zirconium complex catalysts, Non-Patent Document 27 discloses an exemplary reaction of alkene with trihydrophenylsilane in the presence of a catalyst having a diazabutadiene ligand. The catalyst amount is as large as 5 mol %, and trihydrophenylsilane is of low industrial value.

Many rhodium complex catalysts are reported. For example, catalysts having a carbonyl or cyclooctadienyl (COD) group and a N-heterocarbene ligand (Non-Patent Documents 28, 29) need an inert gas atmosphere for handling and storage because of low stability of these complex compounds.

Non-Patent Document 30 discloses to conduct reaction in the presence of an ionic liquid in order to enhance reactivity. The step of separating the ionic liquid from the reaction product is necessary. Since the catalyst used therein has a COD group and a N-heterocarbene group as the ligand, the same problems as described above are left.

Also Non-Patent Document 31 reports an exemplary catalyst which allows for preferential progress of dehydrogenation silylation reaction.

The reaction of triethoxysilane with a styrene derivative in the presence of a catalyst using a functional group-incorporated phosphine ligand (Wilkinson complex) is low in position selectivity (Non-Patent Document 32).

Furthermore, Non-Patent Document 33 reports an example in which an isocyanide compound is added to a complex to form a catalyst, which is used in hydrosilylation reaction without isolation. A study on reactivity with three types of silanes shows that the order of reactivity is from dimethylphenylsilane, which gives the highest yield (yield 81%), next triethylsilane (yield 66%), to triethoxysilane (yield 40%). The reactivity with triethoxysilane which is of the most industrial worth among the three types of silanes is not so high, while the reactivity with siloxanes is reported nowhere.

In addition, the precursor catalyst having a COD group as the ligand requires careful handling and storage.

On the other hand, Non-Patent Document 34 reports that a rhodium catalyst having an acetylacetonato or acetate group enables addition reaction of triethoxysilane in high yields.

Although this method has the advantage of easy storage and handling of the catalyst, no study is made on reactivity with siloxanes which are more useful from the industrial standpoint.

Non-Patent Document 35 reports exemplary reaction of styrene with triethoxysilane in the presence of a rhodium catalyst using polyethylene glycol modified with ionic liquid. However, the position selectivity of reaction is low, and dehydrogenation silylation and reduction of styrene occur simultaneously as side reactions.

In addition, rhodium is likewise an expensive noble metal element. Its catalytic function must be further increased to a higher activity before it can be used in practice as a platinum replacement.

Non-Patent Document 36 discloses a catalyst having a pincer type bis(N-heterocarbene)pyridine ligand as a palladium complex catalyst, and reaction of styrene with heptamethyltrisiloxane. However, the reaction yield is 43-57% and the position selectivity is low.

Yet, palladium is nothing but an expensive noble metal element.

The catalysts with their application to organopolysiloxanes being borne in mind include a catalyst having a phosphine ligand (Patent Document 8), a catalyst having an aryl-alkyl-triazenide group (Patent Document 9), a colloidal catalyst (Patent Document 10), a catalyst coordinated with a sulfide group (Patent Document 11), and a catalyst coordinated with an amino, phosphino or sulfide group and an organosiloxane group (Patent Document 12).

However, reactivity is empirically demonstrated with respect to only platinum, palladium, rhodium and iridium which are expensive metal elements. Thus the method is not regarded cost effective.

In Examples of Patent Documents 13 and 14, only well-known platinum catalysts are demonstrated to exert a catalytic effect while the structure which is combined with another metal to exert catalytic activity is indicated nowhere.

Patent Documents 15 to 17 disclose catalysts coordinated with carbene. Patent Document 15 does not discuss whether or not the catalyst is effective to hydrosilylation reaction.

Patent Documents 16 and 17 disclose catalysts coordinated with carbene and vinylsiloxane, but describe only platinum catalysts in Examples.

In addition, the metal catalysts coordinated with carbene require careful handling because the complex compounds have low storage stability.

Patent Documents 18 and 19 disclose ruthenium catalysts coordinated with $\eta^6$-arene or $\eta^6$-triene. These catalysts have inferior reactivity to platinum catalysts and require careful handling because the complex compounds have low storage stability.

Patent Documents 20 to 26 disclose a method of mixing a metal salt with a compound which coordinates to the metal and using the product as a catalyst rather than the use of metal complexes as the catalyst. Although these Patent Documents describe the progress of hydrosilylation with several exemplary combinations, the yield and other data are described nowhere, and the extent to which the reaction takes place is not evident. In addition, ionic salts or hydride reducing agents are used as the activator in all examples. Nevertheless, almost all examples exhibit no catalytic activity.

PRIOR ART DOCUMENTS

Patent Documents

Patent Document 1: WO 2013/081794
Patent Document 2: WO 2010/016416
Patent Document 3: JP-A 2012-532885
Patent Document 4: JP-A 2012-532884
Patent Document 5: JP-A 2013-544824
Patent Document 6: JP-A 2014-502271
Patent Document 7: JP-A 2014-503507
Patent Document 8: JP-A H06-136126
Patent Document 9: JP-A H06-263780
Patent Document 10: JP-A H01-315344
Patent Document 11: JP 3174616
Patent Document 12: JP-A H07-149780
Patent Document 13: JP-A 2001-131231
Patent Document 14: JP 4007467
Patent Document 15: JP 3599669
Patent Document 16: JP 3854151
Patent Document 17: JP 4249702
Patent Document 18: JP 4934190
Patent Document 19: JP 5032561
Patent Document 20: WO 2013/043846
Patent Document 21: WO 2013/043783
Patent Document 22: WO 2013/043912
Patent Document 23: WO 2014/021908
Patent Document 24: WO 2013/081794
Patent Document 25: WO 2013/043785
Patent Document 26: WO 2013/043787

Non-Patent Documents

Non-Patent Document 1: A. N. Nesmeyanov et al., Tetrahedron, 1962, 17, 61
Non-Patent Document 2: M. S. Wrighton et al., J. Organomet. Chem., 1977, 128, 345
Non-Patent Document 3: F. Kakiuchi et al., J. Organomet. Chem., 1993, 456, 45
Non-Patent Document 4: H. Nakazawa et al., J. Am. Chem. Soc., 2012, 134, 804
Non-Patent Document 5: H. Nakazawa et al., Organometallics, 2012, 31, 3825
Non-Patent Document 6: P. J. Chirik et al., Organometallics, 2012, 31, 4886
Non-Patent Document 7: P. J. Chirik et al., J. Am. Chem. Soc., 2004, 126, 13794
Non-Patent Document 8: P. J. Chirik et al., Science, 2012, 335, 567
Non-Patent Document 9: J. Chen et al., Angew. Chem. Int. Ed., 2015, 54, 4661
Non-Patent Document 10: A. J. Chalk et al., J. Am. Chem. Soc., 1965, 87, 1133
Non-Patent Document 11: A. J. Chalk et al., J. Am. Chem. Soc., 1967, 89, 1640
Non-Patent Document 12: A. J. Chalk et al., J. Organomet. Chem., 1970, 21, 207
Non-Patent Document 13: B. A. Izmailov et al., J. Organomet. Chem., 1978, 149, 29
Non-Patent Document 14: N. Sonoda et al., J. Org. Chem., 1987, 52, 4864
Non-Patent Document 15: S. Murai et al., Chem. Lett., 2000, 14
Non-Patent Document 16: M. S. Wrighton et al., Inorg. Chem., 1980, 19, 3858
Non-Patent Document 17: B. E. Grant et al., J. Am. Chem. Soc., 1993, 115, 2151
Non-Patent Document 18: L. Deng et al., Angew. Chem. Int. Ed., 2013, 52, 10845
Non-Patent Document 19: C. Chen et al., J. Am. Chem. Soc., 2015, in press (DOI: 10.1021/jacs.5b08611)
Non-Patent Document 20: M. Umeno et al., J. Organomet. Chem., 1973, 50, 297
Non-Patent Document 21: I. Kownacki et al., J. Organomet. Chem., 2000, 597, 175
Non-Patent Document 22: P. Valerga et al., Dalton Trans., 2007, 3000
Non-Patent Document 23: T. D. Tilley et al., Chem. Commun., 2012, 48, 7146
Non-Patent Document 24: P. Valerga et al., Organometallics, 2012, 31, 2175
Non-Patent Document 25: I. Buslov et al., Angew. Chem. Int. Ed., 2015, in press (DOI: 10.1002/anie.201507829)
Non-Patent Document 26: T. J. Steiman et al., J. Am. Chem. Soc., 2015, 137, 6104
Non-Patent Document 27: S. Anga et al., Dalton Trans., 2014, 43, 14876
Non-Patent Document 28: T. A. Nile et al., J. Organomet. Chem., 1977, 137, 293
Non-Patent Document 29: M. R. Buchmeiser et al., J. Organomet. Chem., 2005, 690, 4433
Non-Patent Document 30: X. Li et al., J. Organomet. Chem., 2011, 696, 2116
Non-Patent Document 31: S. P. Nolan et al., Dalton Trans., 2013, 42, 270
Non-Patent Document 32: M. Xue et al., Appl. Organomet. Chem., 2014, 28, 120
Non-Patent Document 33: J. M. Walters et al., J. Molecular Catalysis, 1985, 29, 201
Non-Patent Document 34: M. F. Lappert et al., J. Organomet. Chem., 1979, 172, 153
Non-Patent Document 35: Y. Bai et al., J. Organomet. Chem., 2015, 794, 65
Non-Patent Document 36: R. A. Haqie et al., J. Inorg. Chem., 2015, 3169

SUMMARY OF INVENTION

Technical Problem

An object of the invention, which has been made under the above-mentioned circumstances, is to provide a hydrosilylation reaction catalyst which allows hydrosilylation reaction to proceed under mild conditions and has ease of handling and storage stability, a novel isocyanide compound for forming the hydrosilylation reaction catalyst, and a method for preparing an addition compound via hydrosilylation reaction using the catalyst.

Solution to Problem

Making extensive investigations to attain the above objects, the inventors have discovered a novel isocyanide compound which is useful in forming a hydrosilylation reaction catalyst. It has also been found that a catalyst which is obtained using the isocyanide compound as the ligand and a specific metal compound as the catalyst precursor exerts a high activity to hydrosilylation reaction and helps addition reaction take place under mild conditions. The invention is predicated on this finding.

The invention provides an isocyanide compound, a hydrosilylation reaction catalyst and a method for preparing an addition compound, as defined below.

[1] An isocyanide compound having the formula (1) or (1)', exclusive of trimethylsilylmethyl isocyanide, bis(trimethylsilyl)methyl isocyanide, and tris(trimethylsilyl)methyl isocyanide.

$$R^1\text{—}Si(R^1)_a\{[(OSi(R^1)_2)]_b\text{—}R^1\}_c \quad (1)$$

[Chem. 1]

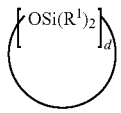

(1)'

In formula (1) or (1)', $R^1$ is each independently a monovalent organic group selected from optionally substituted alkyl, alkoxy, alkenyl, alkynyl, aryl, and aralkyl groups of 1 to 30 carbon atoms which may be separated by at least one atom selected from oxygen, nitrogen, sulfur and phosphorus, and groups having the formula (2):

$$\text{-A-NC} \quad (2)$$

wherein A is an optionally substituted divalent organic group of 1 to 30 carbon atoms which may be separated by at least one atom selected from silicon, oxygen, nitrogen, sulfur and phosphorus, one, two or three of all $R^1$ groups being an organic group of formula (2), a is an integer of 0 to 3, c is an integer of 0 to 3, a+c is equal to 3, b is an integer of 1 to 300, and d is an integer of 3 to 20.

[2] The isocyanide compound of [1] wherein a is 0, 1 or 2.

[3] The isocyanide compound of [1] or [2] wherein one of all $R^1$ groups in formula (1) or (1)' is an organic group of formula (2).

[4] A hydrosilylation reaction catalyst which is the reaction product of a metal salt compound having the formula (3) and an isocyanide compound having the formula (1) or (1)'.

$$M_e(L)_f(X)_g \quad (3)$$

In formula (3), M is a transition metal of Group 8, 9 or 10 in the Periodic Table exclusive of platinum, X is a halogen atom, L is at least one monovalent organic group selected from the following formulae (4) to (6), e is an integer of 1 or 2, f is an integer of 0 to 6, g is an integer of 0 to 3, f+g is equal to 2 or 3 when e=1, and f+g is equal to 4 to 6 when e=2, $$\text{—O—R}^2 \quad (4)$$

$$\text{—OCO—R}^2 \quad (5)$$

$$\text{—OSO}_2\text{—R}^2 \quad (6)$$

in formulae (4) to (6), $R^2$ is each independently an optionally substituted monovalent organic group of 1 to 30 carbon atoms which may be separated by at least one atom selected from oxygen, nitrogen, sulfur and phosphorus, or a monovalent organic group having the formula (7):

$$\text{—(B)}_p R^3 \quad (7)$$

wherein B is an optionally substituted divalent organic group of 1 to 30 carbon atoms which may be separated by at least one atom selected from oxygen, nitrogen, sulfur and phosphorus, p is an integer of 0 or 1, p is 0 or 1 when L is a monovalent organic group of formula (4), and p is 1 when L is a monovalent organic group of formula (5) or (6), $R^3$ is a group having the formula (8):

$$\{Si(R^5)_2\text{—}R^4\}_h\text{—}Si(R^5)_l\{[(OSi(R^5)_2)]_m\text{—}R^5\}_n \quad (8)$$

wherein $R^4$ is an optionally substituted divalent organic group of 1 to 10 carbon atoms which may be separated by at least one oxygen atom, $R^5$ is an optionally substituted alkyl, alkoxy, aryl or aralkyl group of 1 to 30 carbon atoms which may be separated by at least one atom selected from oxygen, nitrogen, sulfur and phosphorus, h is an integer of 0 or 1, l is an integer of 0 to 3, m is an integer of 1 to 300, n is an integer of 0 to 3, l+n is equal to 3.

$$R^1\text{—}Si(R^1)_a\{[(OSi(R^1)_2)]_b\text{—}R^1\}_c \quad (1)$$

[Chem. 2]

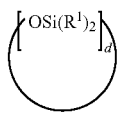

(1)'

In formula (1) or (1)', $R^1$ is each independently a monovalent organic group selected from optionally substituted alkyl, alkoxy, alkenyl, alkynyl, aryl, and aralkyl groups of 1 to 30 carbon atoms which may be separated by at least one atom selected from oxygen, nitrogen, sulfur and phosphorus, and groups having the formula (2):

$$\text{-A-NC} \quad (2)$$

wherein A is an optionally substituted divalent organic group of 1 to 30 carbon atoms which may be separated by at least one atom selected from silicon, oxygen, nitrogen, sulfur and phosphorus, one, two or three of all $R^1$ groups being an organic group of formula (2), a is an integer of 0 to 3, c is an integer of 0 to 3, a+c is equal to 3, b is an integer of 1 to 300, and d is an integer of 3 to 20.

[5] The hydrosilylation reaction catalyst of [4] wherein in formula (1), a is 0, 1 or 2.

[6] The hydrosilylation reaction catalyst of [4] or [5] wherein one of all $R^1$ groups in formula (1) or (1)' is an organic group of formula (2).

[7] The hydrosilylation reaction catalyst of any one of [4] to [6] which is prepared in a system for effecting hydrosilylation reaction between a compound having an aliphatic unsaturated bond and a hydrosilane compound or organohydro(poly)siloxane compound having a Si—H group.

[8] The hydrosilylation reaction catalyst of any one of [4] to [7] wherein M is Fe, Co or Ni, e is 1, f is 2, and g is 0.

[9] The hydrosilylation reaction catalyst of any one of [4] to [7] wherein M is Rh, e is 2, f is 4, and g is 0.

[10] The hydrosilylation reaction catalyst of any one of [4] to [7] wherein M is Ru, e is 2, f is 4, and g is 1.

[11] The hydrosilylation reaction catalyst of any one of [4] to [10] wherein L is a monovalent organic group of formula (5).

[12] The hydrosilylation reaction catalyst of [11] wherein $R^2$ is an optionally halo-substituted alkyl group of 1 to 5 carbon atoms.

[13] A method for preparing a hydrosilylation reaction catalyst, comprising the step of reacting a metal salt compound of formula (3) with an isocyanide compound of formula (1) or (1)', as set forth in [4], in a system for effecting hydrosilylation reaction between a compound having an aliphatic unsaturated bond and a hydrosilane compound or organohydro(poly)siloxane compound having a Si—H group, thereby forming the hydrosilylation reaction catalyst.

[14] A method for preparing an addition compound comprising the step of effecting hydrosilylation reaction of a compound having an aliphatic unsaturated bond with a hydrosilane compound or organohydro(poly)siloxane compound having a Si—H bond in the presence of the hydrosilylation reaction catalyst of any one of [4] to [12].

[15] The method for preparing an addition compound of [14] wherein the compound having an aliphatic unsaturated bond is an olefin compound, or a silane compound or organo(poly)siloxane having an alkenyl group.

[16] A method for preparing an addition compound comprising the steps of preparing a hydrosilylation reaction catalyst from a metal salt of formula (3) and an isocyanide compound of formula (1) or (1)', as set forth in [4], in a system for effecting hydrosilylation reaction between a compound having an aliphatic unsaturated bond and a hydrosilane compound or organohydro(poly)siloxane compound having a Si—H group, and effecting the hydrosilylation reaction in the presence of the hydrosilylation reaction catalyst.

[17] The method for preparing an addition compound of [16] wherein the compound having an aliphatic unsaturated bond is an olefin compound, or a silane compound or organo(poly)siloxane having an alkenyl group.

Advantageous Effects of Invention

The isocyanide compound of the invention is highly soluble in metal compounds as the catalyst precursor and reaction substrates and is useful as the ligand for allowing hydrosilylation reaction to take place effectively. Also since the compound is storable at room temperature and stable in air, it eliminates a need for special equipment upon handling.

On the other hand, the metal compound from which the hydrosilylation reaction catalyst is prepared is readily available as a commercial product or by synthesis in a well-known way. The metal compound is quite easy to handle because of no need for storage at low temperature or in an inert gas atmosphere and no need for handling (e.g., weighing) in a glove box, and advantageously maintains high activity even after long-term exposure to air.

Also, since the inventive catalyst does not possess such a ligand as carbonyl group, $\eta^4$-diene group, $\eta^5$-cyclopentadienyl group, $\eta^6$-arene or triene group, it has advantages including shelf stability, ease of handling and high reactivity.

In general, in order to generate a catalytic active species using a metal compound, a reducing agent must be added to reduce a high valence metal species within the system. Since one reactant, hydrosilane itself is utilized as the reducing agent, the invention allows addition reaction to take place via the desired hydrosilylation without a need for a reducing agent.

The catalyst prepared from a metal compound and an isocyanide compound may be used after isolation as a metal complex compound, or it may be prepared in a hydrosilylation reaction system and used therein without isolation.

If hydrosilylation reaction between a compound containing an aliphatic unsaturated group and a silane or (poly)siloxane having a Si—H group is carried out in the presence of the catalyst prepared from a metal compound and an isocyanide compound, addition reaction is possible under such conditions as room temperature to 100° C. In particular, addition reaction with industrially useful (poly)siloxanes, trialkoxysilanes and dialkoxysilanes takes place effectively.

Although the cited documents describe that addition reaction to an unsaturated group and reaction to produce an unsaturated group-containing compound by dehydrogenative silylation reaction often take place simultaneously, the use of the inventive catalyst ensures selective progress of addition reaction to an unsaturated group.

Further, in the reaction with internal olefin which is difficult with the prior art catalysts, an addition reaction product accompanied with the migration of an unsaturated group to the terminal is obtainable. The invention offers very high utility in the silicone industry.

DESCRIPTION OF EMBODIMENTS

(1)

[Chem. 3]

(1)'

In formula (1) or (1)', $R^1$ is each independently a monovalent organic group selected from optionally substituted alkyl, alkoxy, alkenyl, alkynyl, aryl, and aralkyl groups of 1 to 30 carbon atoms which may be separated by at least one atom selected from oxygen, nitrogen, sulfur and phosphorus, and groups having the formula (2):

-A-NC  (2)

wherein A is an optionally substituted divalent organic group of 1 to 30 carbon atoms which may be separated by at least one atom selected from silicon, oxygen, nitrogen, sulfur and phosphorus, one, two or three of all $R^1$ groups being an organic group of formula (2), a is an integer of 0 to 3, c is an integer of 0 to 3, a+c is equal to 3, b is an integer of 1 to 300, and d is an integer of 3 to 20.

In formula (1) or (1)', $R^1$ is each independently a monovalent organic group selected from an optionally substituted monovalent organic group of 1 to 30 carbon atoms which may be separated by one or more atoms selected from oxygen, nitrogen, sulfur and phosphorus, and a group having the formula (2):

-A-NC  (2)

wherein A is an optionally substituted divalent organic group of 1 to 30 carbon atoms which may be separated by one or more atoms selected from silicon, oxygen, nitrogen, sulfur and phosphorus, one, two or three of all $R^1$ groups being an organic group of formula (2), a is an integer of 0 to 3, c is an integer of 0 to 3, a+c is equal to 3, b is an integer of 1 to 300, preferably 1 to 100, more preferably 1 to 50, and d is an integer of 3 to 20, preferably 3 to 10, more preferably 3 to 5.

Among isocyanide compounds according to the invention, novel isocyanide compounds are those compounds having the formula (1) or (1)', from which trimethylsilylmethyl isocyanide (Me$_3$SiCH$_2$NC), bis(trimethylsilyl)methyl isocyanide [(Me$_3$Si)$_2$CHCN], and tris(trimethylsilyl)methyl isocyanide [(Me$_3$Si)$_3$CNC] are excluded.

The C$_1$-C$_{30}$ monovalent organic groups are preferably C$_1$-C$_{30}$ monovalent hydrocarbon groups or alkoxy groups, though not limited thereto.

Suitable monovalent hydrocarbon groups include alkyl, alkenyl, alkynyl, aryl and aralkyl groups.

The alkyl groups may be straight, branched or cyclic and preferably C$_1$-C$_{20}$, more preferably C$_1$-C$_{10}$ alkyl groups. Examples include straight or branched alkyl groups such as methyl, ethyl, n-propyl, isopropyl, n-butyl, isobutyl, s-butyl, t-butyl, n-pentyl, n-hexyl, n-heptyl, n-octyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, and n-eicosanyl; and cycloalkyl groups such as cyclopropyl, cyclobutyl, cyclopentyl, cyclohexyl, cycloheptyl, cyclooctyl, cyclononyl, norbornyl, and adamantyl.

The alkenyl groups are preferably C$_2$-C$_{20}$ alkenyl groups. Examples include ethenyl, n-1-propenyl, n-2-propenyl, 1-methylethenyl, n-1-butenyl, n-2-butenyl, n-3-butenyl, 2-methyl-1-propenyl, 2-methyl-2-propenyl, 1-ethylethenyl, 1-methyl-1-propenyl, 1-methyl-2-propenyl, n-1-pentenyl, n-1-decenyl, and n-1-eicosenyl.

The alkynyl groups are preferably C$_2$-C$_{20}$ alkynyl groups. Examples include ethynyl, n-1-propynyl, n-2-propynyl, n-1-butynyl, n-2-butynyl, n-3-butynyl, 1-methyl-2-propynyl, n-1-pentynyl, n-2-pentynyl, n-3-pentynyl, n-4-pentynyl, 1-methyl-n-butynyl, 2-methyl-n-butynyl, 3-methyl-n-butynyl, 1,1-dimethyl-n-propynyl, n-1-hexynyl, n-1-decynyl, n-1-pentadecynyl, and n-1-eicosynyl.

The aryl groups are preferably C$_6$-C$_{30}$, more preferably C$_6$-C$_{20}$ aryl groups. Examples include phenyl, 1-naphthyl, 2-naphthyl, anthryl, phenanthryl, o-biphenylyl, m-biphenylyl, and p-biphenylyl.

The aralkyl groups are preferably C$_7$-C$_{30}$, more preferably C$_7$-C$_{20}$ aralkyl groups. Examples include benzyl, phenylethyl, phenylpropyl, naphthylmethyl, naphthylethyl, and naphthylpropyl.

The alkoxy groups are preferably C$_1$-C$_{10}$ alkoxy groups. Examples include methoxy, ethoxy, n-propoxy, i-propoxy, n-butoxy, i-butoxy, s-butoxy, t-butoxy, n-pentoxy, n-hexoxy, n-heptyloxy, n-octyloxy, n-nonyloxy, and n-decyloxy.

Examples of the substituent on R$^1$ include halogen atoms such as fluorine, chlorine, bromine and iodine, alkoxy groups such as methoxy, ethoxy and propoxy, and amino groups such as dialkylamino.

In formula (2), A is an optionally substituted divalent organic group of 1 to 30 carbon atoms which may be separated by one or more atoms selected from silicon, oxygen, nitrogen, sulfur and phosphorus. The C$_1$-C$_{30}$ divalent organic groups are preferably C$_1$-C$_{30}$, especially C$_2$-C$_{30}$ divalent hydrocarbon groups, but not limited thereto.

Suitable divalent hydrocarbon groups include alkylene, arylene and aralkylene groups.

The alkylene groups may be straight, branched or cyclic ones, preferably C$_1$-C$_{20}$, more preferably C$_1$-C$_{10}$ alkylene groups. Examples include straight or branched alkylene groups such as methylene, ethylene, propylene, trimethylene, n-butylene, isobutylene, s-butylene, n-octylene, 2-ethylhexylene, n-decylene, n-undecylene, n-dodecylene, n-tridecylene, n-tetradecylene, n-pentadecylene, n-hexadecylene, n-heptadecylene, n-octadecylene, n-nonadecylene, and n-eicosanylene; and cycloalkylene groups such as 1,4-cyclohexylene.

The arylene groups are preferably C$_6$-C$_{30}$, more preferably C$_6$-C$_{20}$ arylene groups. Examples include o-phenylene, m-phenylene, p-phenylene 1,2-naphthylene, 1,8-naphthylene, 2,3-naphthylene, and 4,4'-biphenylene.

The aralkylene groups are preferably C$_7$-C$_{30}$, more preferably C$_7$-C$_{20}$ aralkylene groups. Examples include —(CH$_2$)$_k$—Ar— wherein Ar is a C$_6$-C$_{20}$ arylene group and k is an integer of 1 to 10, —Ar—(CH$_2$)$_k$— wherein Ar and k are as defined above, and —(CH$_2$)$_k$—Ar—(CH$_2$)$_k$— wherein Ar is as defined above and k is each independently as defined above.

Examples of the substituent include halogen atoms such as fluorine, chlorine, bromine and iodine, alkoxy groups such as methoxy, ethoxy and propoxy, and amino groups such as dialkylamino.

In formula (1), one, two or three of all R$^1$ groups are organic groups of formula (2), and the isocyanide compound may be a single compound or plural compounds. Preferably one or two of all R$^1$ groups are organic groups of formula (2), most preferably one of all R$^1$ groups is an isocyanide-containing organic group of formula (2).

The subscript "a" is an integer of 0 to 3. The formula (1) represents a tetraorganosilane compound in case of a=3, and an organo(poly)siloxane compound having a siloxane group in the molecule in case of a=0 to 2. Also in case of a=0 to 2, the monovalent organic group of formula (2) may bond to the organo(poly)siloxane skeleton at its end or side chain. As used herein, the term "(poly)siloxane" refers to a siloxane when only one siloxy group is included and a polysiloxane when two or more siloxy groups are included.

Examples of the silyl group or (poly)organosiloxane group which is a residue resulting from elimination of the monovalent organic group of formula (2) include, but are not limited to, trimethylsilyl, triethylsilyl, phenyldimethylsilyl, trimethoxysilyl, triethoxysilyl, pentamethyldisiloxy, bistrimethylsiloxymethylsilyl, tristrimethylsiloxysilyl, polydimethylsiloxy group: —Si(Me)$_2${OSi(Me)$_2$}$_{(b-1)}$OSiMe$_3$ wherein b is as defined above, (poly)dimethylsiloxy group: —Si(Me)$_2${OSi(Me)$_2$}$_{(b-1)}$OSiMe$_2$nBu wherein b is as defined above, and (poly)dimethylsiloxy group: —Si(Me)$_2${OSi(Me)$_2$}$_{(b-1)}$OSiMe$_2$-. Also included is a polyorganosiloxy group containing a siloxane group of dendrimer type which is highly branched via silethylene groups.

The isocyanide compounds may be synthesized by any well-known methods. One example is a method involving forming a formyl compound from an amine compound and formic acid, and reacting the formyl compound with phosphoryl chloride in the presence of an organic amine (Synthesis Method 1, see Organometallics, 2004, 23, 3976-3981). One method for obtaining a formyl compound under moderate conditions is a method for obtaining a formyl compound by forming acetic acid/formic acid anhydride from acetic anhydride and formic acid and reacting it with an amine compound (Synthesis Method 2, see Org. Synth., 2013, 90, 358-366). The formyl compound obtained by this method may then be converted to an isocyanide compound by Synthesis Method 1.

Also known is a method for obtaining a formyl compound by treating formamide with sodium hydride into an anion and reacting it with a halogen compound (Synthesis Method 3, see Synthetic Communications, 1986, 16, 865-869). The formyl compound thus obtained may then be converted to an isocyanide compound by Synthesis Method 1.

On the other hand, as the method not involving formylation, synthesis may be conducted by reacting an amine compound with dichlorocarbene to form an isocyanide compound (Synthesis Method 4, see Tetrahedron Letters, 1972, 17, 1637-1640).

When the desired isocyanide compound has a siloxane skeleton, it is preferably prepared by formylating an amino-containing siloxane compound under moderate conditions as in Synthesis Method 2, and converting to isocyanide by Synthesis Method 1 or converting to isocyanide by Synthesis Method 4.

The amine compound or halogen compound used herein may be a compound having the formula (1').

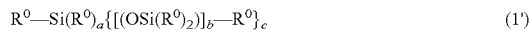

In formula (1'), $R^0$ is each independently a monovalent organic group selected from an optionally substituted $C_1$-$C_{30}$ monovalent organic group which may be separated by one or more atoms selected from oxygen, nitrogen, sulfur and phosphorus and a group having the formula (2'):

wherein A is an optionally substituted $C_1$-$C_{30}$ divalent organic group which may be separated by one or more atoms selected from silicon, oxygen, nitrogen, sulfur and phosphorus and X is $NH_2$ for the amine compound or halogen for the halogen compound, one, two or three of all groups $R^0$ being an organic group having formula (2'), a, b and c are as defined above.

Below, conditions for synthesis from the amine compound are outlined.

(i) Formylation by Synthesis Method 1: Formylation is achieved by adding an excess of formic acid to an amine compound and dehydrating under reflux.

(ii) Conversion from formyl compound to isocyanide compound by Synthesis Method 1: The target compound is obtained by dissolving a formyl compound and diisopropylamine in methylene chloride, cooling at 0° C., adding phosphoryl chloride dropwise, stirring for further 2 hours, adding sodium carbonate aqueous solution, allowing to stand at room temperature overnight, and post-treatment. If necessary, the compound is purified by distillation or sublimation.

(iii) Formylation by Synthesis Method 2: Formic acid is added to acetic anhydride (2 equivalents of formic acid relative to acetic anhydride), yielding a formylating agent (acetic/formic anhydride). On the other hand, an amine compound is dissolved in tetrahydrofuran (THF), which is cooled at −15° C. The formylating agent is added dropwise so that the internal temperature may not exceed −5° C., and stirred for 2 hours. The target compound is obtained by post-treatment and then converted into isocyanide.

(iv) Formation of isocyanide compound by Synthesis Method 4: The isocyanide compound is obtained by mixing an amine compound, chloroform, phase transfer catalyst (benzyltriethylammonium chloride), and methylene chloride, adding 50 wt % sodium hydroxide aqueous solution, stirring for 2 hour under reflux of methylene chloride, and post-treatment.

Also, in the case of synthesis from the halogen compound, formylation may be conducted by Synthesis Method 3 as follows. A formyl compound is obtained by dispersing sodium hydride (60% paraffin dispersion) in DMF, adding formamide thereto, stirring at 120° C. for 45 minutes, cooling at 60° C., adding the halogen compound, stirring at 120° C. for 24 hours, filtering the salt, and distilling off the solvent (DMF). Notably, the subsequent isocyanide conversion is the same as Synthesis Method 1.

The isocyanide compound of the invention serves as an effective ligand for hydrosilylation reaction when used along with a metal compound as shown below. It quite effectively enhances catalytic activity as compared with isocyanide compounds free of silicon atom, especially free of siloxane skeleton.

Upon hydrosilylation reaction, an isocyanide compound free of a silicon atom or organosiloxane group may be simultaneously used together with the inventive isocyanide compound as long as the benefits of the invention are not compromised. Herein, not only well-known isocyanide compounds, but also isocyanide compounds which can be synthesized by any of the foregoing methods are useful.

Examples of the silicon-free isocyanide compound include, but are not limited to, alkyl isocyanides such as methyl isocyanide, ethyl isocyanide, n-propyl isocyanide, cyclopropyl isocyanide, n-butyl isocyanide, isobutyl isocyanide, sec-butyl isocyanide, t-butyl isocyanide, n-pentyl isocyanide, isopentyl isocyanide, neopentyl isocyanide, n-hexyl isocyanide, cyclohexyl isocyanide, cycloheptyl isocyanide, 1,1-dimethylhexyl isocyanide, 1-adamantyl isocyanide, and 2-adamantyl isocyanide; aryl isocyanides such as phenyl isocyanide, 2-methylphenyl isocyanide, 4-methylphenyl isocyanide, 2,4-dimethylphenyl isocyanide, 2,5-dimethylphenyl isocyanide, 2,6-dimethylphenyl isocyanide, 2,4,6-trimethylphenyl isocyanide, 2,4,6-tri-t-butylphenyl isocyanide, 2,6-diisopropylphenyl isocyanide, 1-naphthyl isocyanide, 2-naphthyl isocyanide, 2-methyl-1-naphthyl isocyanide; aralkyl isocyanides such as benzyl isocyanide and phenylethyl isocyanide.

The hydrosilylation reaction catalyst of the invention is prepared from the isocyanide compound defined above and a metal compound having the formula (3).

In formula (3), M is a transition metal of Group 8, 9 or 10 in the Periodic Table exclusive of platinum. Among others, Fe, Co, Ni, Ru, Rh, Pd, Os, and Ir are preferred, and in view of availability and cost of metal salts and catalytic activity, Fe, Co, Ni, Ru, Rh, Os and Ir are more preferred, with Fe, Co, Ru, Ni and Rh being most preferred.

X is a halogen atom, for example, fluorine, chlorine, bromine or iodine. Chlorine and bromine are preferred, with chlorine being more preferred.

The subscript e is an integer of 1 or 2, f is an integer of 0 to 6, g is an integer of 0 to 3, f+g is equal to 2 or 3 when e=1, and f+g is equal to 4 to 6 when e=2.

L is a monovalent organic group which bonds with the transition metal M via an oxygen atom, specifically at least one group selected from the formulae (4) to (6), preferably a monovalent organic group of formula (5).

In formulae (4) to (6), $R^2$ is each independently an optionally substituted monovalent organic group of 1 to 30 carbon atoms which may be separated by one or more atoms selected from oxygen, nitrogen, sulfur and phosphorus, or a monovalent organic group having the formula (7).

The $C_1$-$C_{30}$ monovalent organic groups are preferably $C_1$-$C_{30}$ monovalent hydrocarbon groups, though not limited thereto.

Suitable monovalent hydrocarbon groups include alkyl, alkenyl, alkynyl, aryl and aralkyl groups.

The alkyl groups may be straight, branched or cyclic and preferably $C_1$-$C_{20}$, more preferably $C_1$-$C_{10}$ alkyl groups. Examples include straight or branched alkyl groups such as methyl, ethyl, n-propyl, isopropyl, n-butyl, isobutyl, s-butyl, t-butyl, n-pentyl, n-hexyl, n-heptyl, n-octyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, and n-eicosanyl; and cycloalkyl groups such as cyclopropyl, cyclobutyl, cyclopentyl, cyclohexyl, cycloheptyl, cyclooctyl, cyclononyl, norbornyl, and adamantyl.

The alkenyl groups are preferably $C_2$-$C_{20}$ alkenyl groups. Examples include ethenyl, n-1-propenyl, n-2-propenyl, 1-methylethenyl, n-1-butenyl, n-2-butenyl, n-3-butenyl, 2-methyl-1-propenyl, 2-methyl-2-propenyl, 1-ethylethenyl, 1-methyl-1-propenyl, 1-methyl-2-propenyl, n-1-pentenyl, n-1-decenyl, and n-1-eicosenyl.

The alkynyl groups are preferably $C_2$-$C_{20}$ alkynyl groups. Examples include ethynyl, n-1-propynyl, n-2-propynyl, n-1-butynyl, n-2-butynyl, n-3-butynyl, 1-methyl-2-propynyl, n-1-pentynyl, n-2-pentynyl, n-3-pentynyl, n-4-pentynyl, 1-methyl-n-butynyl, 2-methyl-n-butynyl, 3-methyl-n-butynyl, 1,1-dimethyl-n-propynyl, n-1-hexynyl, n-1-decynyl, n-1-pentadecynyl, and n-1-eicosynyl.

The aryl groups are preferably $C_6$-$C_{30}$, more preferably $C_6$-$C_{20}$ aryl groups. Examples include phenyl, 1-naphthyl, 2-naphthyl, anthryl, phenanthryl, o-biphenylyl, m-biphenylyl, and p-biphenylyl.

The aralkyl groups are preferably $C_7$-$C_{30}$, more preferably $C_7$-$C_{20}$ aralkyl groups. Examples include benzyl, phenylethyl, phenylpropyl, naphthylmethyl, naphthylethyl, and naphthylpropyl.

It is noted that one or more atoms selected from oxygen, nitrogen, silicon, sulfur, and phosphorus may intervene in these groups as long as the activity of the inventive hydrosilylation reaction catalyst is not compromised.

Also, the $C_1$-$C_{30}$ monovalent organic group may have a substituent or a plurality of identical or different substituents at an arbitrary position(s).

Examples of the substituent include halogen atoms such as fluorine, chlorine, bromine and iodine, alkoxy groups such as methoxy, ethoxy and propoxy, and amino groups such as dialkylamino.

In formula (7), B is an optionally substituted divalent organic group of 1 to 30 carbon atoms which may be separated by one or more atoms selected from oxygen, nitrogen, sulfur and phosphorus, p is an integer of 0 or 1, p is 0 or 1 when L is a monovalent organic group of formula (4), and p is 1 when L is a monovalent organic group of formula (5) or (6).

The $C_1$-$C_{30}$ divalent organic groups are preferably $C_1$-$C_{30}$ divalent hydrocarbon groups, but not limited thereto.

Suitable divalent hydrocarbon groups include alkylene, arylene and aralkylene groups.

The alkylene groups may be straight, branched or cyclic ones, preferably $C_1$-$C_{20}$, more preferably $C_1$-$C_{10}$ alkylene groups. Examples include straight or branched alkylene groups such as methylene, ethylene, propylene, trimethylene, n-butylene, isobutylene, s-butylene, n-octylene, 2-ethylhexylene, n-decylene, n-undecylene, n-dodecylene, n-tridecylene, n-tetradecylene, n-pentadecylene, n-hexadecylene, n-heptadecylene, n-octadecylene, n-nonadecylene, and n-eicosanylene; and cycloalkylene groups such as 1,4-cyclohexylene.

The arylene groups are preferably $C_6$-$C_{30}$, more preferably $C_6$-$C_{20}$ arylene groups. Examples include o-phenylene, m-phenylene, p-phenylene 1,2-naphthylene, 1,8-naphthylene, 2,3-naphthylene, and 4,4'-biphenylene.

The aralkylene groups are preferably $C_7$-$C_{30}$, more preferably $C_7$-$C_{20}$ aralkylene groups. Examples include —(CH$_2$)$_k$—Ar— wherein Ar is a $C_6$-$C_{20}$ arylene group and k is an integer of 1 to 10, —Ar—(CH$_2$)$_k$— wherein Ar and k are as defined above, and —(CH$_2$)$_k$—Ar—(CH$_2$)$_k$— wherein Ar is as defined above and k is each independently as defined above.

$R^3$ is a silyl or (poly)organosiloxane group having the formula (8).

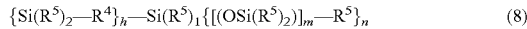

$$\{Si(R^5)_2—R^4\}_h—Si(R^5)_1\{[(OSi(R^5)_2)]_m—R^5\}_n \qquad (8)$$

Herein $R^4$ is an optionally substituted divalent hydrocarbon group of 1 to 10 carbon atoms which may be separated by one or more oxygen atoms, $R^5$ is each independently an optionally substituted monovalent organic group of 1 to 30 carbon atoms which may be separated by one or more atoms selected from oxygen, nitrogen, sulfur and phosphorus, h is 0 or 1, l is an integer of 0 to 3, m is an integer of 1 to 300, preferably 1 to 100, more preferably 1 to 50, n is an integer of 0 to 3, and l+n is equal to 3.

Preferred $C_1$-$C_{10}$ divalent hydrocarbon groups are $C_1$-$C_{10}$ alkylene groups, but not limited thereto. The alkylene groups may be straight, branched or cyclic. Examples include straight or branched alkylene groups such as methylene, ethylene, propylene, trimethylene, n-butylene, isobutylene, s-butylene, n-octylene, 2-ethylhexylene, and n-decylene; and cycloalkylene groups such as 1,4-cyclohexylene. Inter alia, ethylene and propylene are preferred.

The $C_1$-$C_{30}$ monovalent organic groups are preferably $C_1$-$C_{30}$ monovalent hydrocarbon groups, though not limited thereto.

Suitable monovalent hydrocarbon groups include alkyl, alkenyl, alkynyl, aryl and aralkyl groups, examples of which are the same as exemplified above.

Preferably $R^3$ is a silyl or (poly)organosiloxane group having the formula (9) corresponding to h=0.

$$—Si(R^5)_1\{[(OSi(R^5)_2)]_m—R^5\}_n \qquad (9)$$

Examples of the silyl or (poly)organosiloxane group having formula (9) include, but are not limited to, trimethylsilyl, triethylsilyl, phenyldimethylsilyl, trimethoxysilyl, triethoxysilyl, pentamethyldisiloxy, bistrimethylsiloxymethylsilyl, tristrimethylsiloxysilyl, (poly)dimethylsiloxy group: —Si(Me)$_2$\{OSi(Me)$_2$\}$_{(m-1)}$—OSiMe$_3$ wherein m is as defined above, and (poly)dimethylsiloxy group: —Si(Me)$_2$\{OSi(Me)$_2$\}$_{(m-1)}$—OSiMe$_2$nBu wherein m is as defined above.

Besides the group of the general formula (8), $R^3$ may be a siloxane group of dendrimer type which is highly branched via silethylene groups.

Among others, $R^5$ is preferably an optionally halo-substituted $C_1$-$C_{30}$ monovalent hydrocarbon group, more preferably an optionally halo-substituted $C_1$-$C_{10}$ alkyl group, even more preferably an optionally halo-substituted $C_1$-$C_5$ alkyl group.

In formula (3), e is 1 or 2, f is an integer of 0 to 6, g is an integer of 0 to 3, they are selected in compliance with the valence of the metal element (M), f+g is equal to 2 or 3 when e=1, and f+g is equal to 4 to 6 when e=2.

Specifically, when M in formula (3) is Fe, Co or Ni, preferably e is 1, f is 2 or 0, and g is 0, 2 or 3; more preferably e is 1, f is 2, and g is 0.

When M in formula (3) is Rh, preferably e is 2, f is 4, and g is 0.

When M in formula (3) is Ru, preferably e is 2, f is 4, and g is 1.

Examples of the metal compound which may be preferably used as the catalyst precursor in the invention include, but are not limited to, iron compounds such as iron(II) acetate, iron(II) pivalate, iron(II) trifluoroacetate (tetrahydrofuran complex, referred to as THF hereinafter), and iron complexes having an iron-oxygen bond, as prepared from [Fe(mesityl)(μ-mesityl)]$_2$ and alcohols, carboxylic acids or siloxane-containing carboxylates; cobalt compounds such as cobalt(II) acetate, cobalt(II) chloride, cobalt(II) bromide, cobalt(II) isopropoxide, cobalt(II) pivalate, and cobalt(II) trifluoroacetate (THF); nickel compounds such as nickel(II) acetate and nickel(II) pivalate; ruthenium compounds such as Ru$_2$(μ-OAc)$_4$Cl; and rhodium compounds such as rhodium(II) acetate dimer.

It is noted that these metal salts are available as commercial products or by synthesis according to the methods described in the literature (e.g., J. Cluster. Sci., 2005, 16, 331; Inorganic Chemistry, 2007, 46, 3378; Organometallics, 1993, 12, 2414; Russ. Chem. Bull., 1999, 48, 1751; J. Inorg. Nucl. Chem., 1966, 28, 2285).

Although the amounts of the metal compound and the isocyanide compound used in preparing the hydrosilylation reaction catalyst are not particularly limited, preferably 1 equivalent of the metal compound is combined with about 0.5 to 15 equivalents of the isocyanide compound, more preferably 1 to 10 equivalents, even more preferably 2 to 8 equivalents of the isocyanide compound.

It is noted that when the inventive isocyanide compound and a well-known isocyanide compound free of a silicon group are used in combination as the ligand, the total amount of these compounds should preferably fall in the above range.

When hydrosilylation reaction is performed in the presence of the inventive hydrosilylation reaction catalyst, the amount of the catalyst used is not particularly limited. In order that the reaction take place under mild conditions of the order of room temperature to about 100° C. to form the desired compound in high yields, the catalyst is preferably used in an amount of at least 0.001 mol %, more preferably at least 0.01 mol %, even more preferably at least 0.05 mol % of metal compound per mole of the substrate, compound having an aliphatic unsaturated group.

Although no upper limit is imposed on the amount of the metal compound used, the upper limit is preferably about 10 mol %, more preferably 5 mol % of the metal compound per mole of the substrate as viewed from the economical aspect.

A well-known two-electron donative ligand may be used in combination with the inventive hydrosilylation reaction catalyst as long as the activity of the catalyst is not impaired. Although the two-electron donative ligand is not particularly limited, ligands other than carbonyl are preferred, for example, ammonia molecules, ether compounds, amine compounds, phosphine compounds, phosphite compounds, and sulfide compounds.

In a preferred embodiment, the hydrosilylation reaction catalyst is prepared from the metal compound and the isocyanide compound in a reaction system where hydrosilylation reaction of an aliphatic unsaturation-bearing compound with a hydrosilane compound or organohydro(poly)siloxane compound having a Si—H group is carried out, and used in the reaction system.

In this embodiment, once the catalyst is prepared from the metal compound and the isocyanide compound, the aliphatic unsaturation-bearing compound and the hydrosilane compound or organohydro(poly)siloxane compound having a Si—H group may be added thereto, or separate sets of some components may be fed, or all components may be fed at a time.

The aliphatic unsaturation-bearing compound and the hydrosilane compound or organohydro(poly)siloxane compound having a Si—H group may be used in such amounts that the molar ratio of aliphatic unsaturated group/Si—H group may range from 1/10 to 10/1, preferably from 1/5 to 5/1, more preferably from 1/3 to 3/1.

Although the reaction conditions for the metal compound and isocyanide compound are not particularly limited, generally the reaction temperature is about 10 to about 100° C., preferably 30 to 80° C. and the reaction time is about 1 to about 48 hours. During catalyst preparation and hydrosilylation reaction, an organic solvent may be used if necessary.

The organic solvent, if used, may be of any type as long as the reaction is not affected. Examples include aliphatic hydrocarbons such as pentane, hexane, heptane, octane, and cyclohexane, ethers such as diethyl ether, diisopropyl ether, dibutyl ether, cyclopentyl methyl ether, tetrahydrofuran, and 1,4-dioxane; and aromatic hydrocarbons such as benzene, toluene, xylene, and mesitylene. The hydrosilylation reaction catalyst having any of various structures may be obtained depending on a combination of the metal compound and the isocyanide compound and other conditions.

In conducting hydrosilylation reaction in the presence of the inventive hydrosilylation reaction catalyst, as long as a compound having an aliphatic unsaturated bond such as an olefin, silane or organo(poly)siloxane compound having an aliphatic unsaturated bond and a hydrosilane or organohydro(poly)siloxane compound having a Si—H bond are used in combination, no limit is imposed on the structure of the respective compounds.

Examples of the compound having an aliphatic unsaturated bond are shown below.

Olefin compounds:
  alkenes such as ethylene, propylene, butylene, isobutylene, hexene, octene, decene, dodecene, n-hexadecene, isohexadecene, n-octadecene, isooctadecene, norbornene, and trifluoropropene;
  alkynes such as ethyne, propyne, butyne, pentyne, hexyne, octyne, decyne, dodecyne, hexadecyne, and octadecyne;
  in addition to those having an unsaturated group at an end, those having an unsaturated group inside;
  those having a plurality of unsaturated groups in the molecule, such as hexadiene and octadiene;
  aromatic group-containing alkenes such as styrene, 2-methylstyrene, 4-chlorostyrene, 4-methoxystyrene, α-methylstyrene, 4-methyl-α-methylstyrene, and allylbenzene;
  alkenes such as allyl glycidyl ether, allyl glycol, allyl benzyl ether, diethylene glycol monoallyl ether, diethylene glycol allyl methyl ether, polyoxyethylene monoallyl ether, polyoxypropylene monoallyl ether, poly(oxyethylene-oxypropylene) monoallyl ether, polyoxyethylene diallyl ether, polyoxypropylene diallyl ether, and poly(oxyethylene-oxypropylene) diallyl ether.

Silane compounds:
  trimethylvinylsilane, triethylvinylsilane, trimethoxyvinylsilane, triethoxyvinylsilane, dimethoxymethylvinylsilane, diethoxymethylvinylsilane, methoxydimethylvinylsilane, ethoxydimethylvinylsilane, trimethoxyallylsilane, triethoxyallylsilane, triisopropoxyvinylsilane, phenyldimethoxyvinylsilane, phenyldiethoxyvinylsilane, diphenylmethoxyvinylsilane, diphenylethoxyvinylsilane, triphenylvinylsilane, triphenylvinylsilane.

Siloxanes:

pentamethylvinyldisiloxane, tetramethyldivinyldisiloxane, heptamethylvinyltrisiloxane, dimethyldiphenyldivinyldisiloxane, dimethylvinylsiloxy-endcapped dimethylpolysiloxane, dimethylvinylsiloxy-endcapped dimethylsiloxane/diphenylsiloxane copolymers, trimethylsiloxy-endcapped dimethylsiloxane/methylvinylsiloxane copolymers, trimethylsiloxy-endcapped dimethylsiloxane/diphenylsiloxane/methylvinylsiloxane copolymers, dimethylvinylsiloxy-endcapped dimethylsiloxane/methylvinylsiloxane copolymers, dimethylvinylsiloxy-endcapped dimethylsiloxane/methylvinylsiloxane/diphenylsiloxane copolymers, hydroxy-endcapped dimethylsiloxane/methylvinylsiloxane copolymers, α-vinyldimethylpolysiloxane.

Exemplary of the Si—H group-bearing compound are the silane compounds and siloxane compounds shown below.

Silanes:

trimethoxyhydrosilane, triethoxyhydrosilane, triisopropoxyhydrosilane, dimethoxymethylhydrosilane, diethoxymethylhydrosilane, dimethoxyphenylhydrosilane, diethoxyphenylhydrosilane, methoxydimethylhydrosilane, ethoxydimethylhydrosilane, triphenylhydrosilane, diphenyldihydrosilane, phenyltrihydrosilane, diphenylmethylhydrosilane, phenyldimethylhydrosilane, diphenylmethoxyhydrosilane, diphenylethoxyhydrosilane.

Siloxanes:

pentamethylhydrodisiloxane, tetramethyldihydrodisiloxane, heptamethylhydrotrisiloxane, octamethyldihydrotetrasiloxane, dimethylhydrosiloxy-endcapped dimethylpolysiloxane, dimethylhydrosiloxy-endcapped methylpolysiloxane, dimethylhydrosiloxy-endcapped dimethylsiloxane/diphenylsiloxane copolymers, trimethylsiloxy-endcapped dimethylsiloxane/methylhydrosiloxane copolymers, trimethylsiloxy-endcapped dimethylsiloxane/diphenylsiloxane/methylhydrosiloxane copolymers, dimethylhydrosiloxy-endcapped dimethylsiloxane/methylhydrosiloxane copolymers, dimethylhydrosiloxy-endcapped dimethylsiloxane/methylhydrosiloxane/diphenylsiloxane copolymers, hydroxy-endcapped dimethylsiloxane/methylhydrosiloxane copolymers, one end dimethylhydrosiloxy-capped dimethylpolysiloxane.

The hydrosilylation reaction in the presence of the inventive hydrosilylation reaction catalyst is applicable to all applications which are industrially implemented using prior art platinum catalysts, including silane coupling agents obtained from an olefin compound having an aliphatic unsaturated bond and a silane compound having a Si—H bond, and modified silicone oils obtained from an olefin compound having an aliphatic unsaturated bond and an organopolysiloxane having a Si—H bond, as well as silicone cured products obtained from an organopolysiloxane compound having an aliphatic unsaturated bond and an organopolysiloxane having a Si—H bond.

EXAMPLES

Synthesis Examples, Examples and Comparative Examples are given below by way of illustration and not by way of limitation.

All solvents were deoxygenated and dehydrated by well-known methods before they were used in the preparation of metal compounds.

The metal compounds obtained were stored in a nitrogen gas atmosphere at 25° C. until they were used in reaction.

Hydrosilylation reaction and solvent purification of alkenes were always carried out in an inert gas atmosphere. The solvents and other ingredients were purified, dried and deoxygenated by well-known methods before they were used in various reactions.

Analysis of $^1$H-, $^{13}$C- and $^{19}$F-NMR spectroscopy was performed by JNM-ECA600 and JNM-LA 400 of JEOL Ltd., IR spectroscopy by FT/IR-550 of JASCO Corp.

It is understood that hydrogen atoms are omitted from the chemical structural formula, shown below, according to the conventional expression. OAc stands for an acetate anion, and iPr for isopropyl.

[Synthesis Example 1] Synthesis of Iron Pivalate

With reference to J. Cluster. Sci., 2005, 16, 331, the compound was synthesized by the following procedure.

A 50 mL two-necked round-bottomed flask equipped with a reflux condenser was charged with 0.86 g (15.4 mmol) of reduced iron and 3.50 g (34.3 mmol) of pivalic acid, and a mixture was heated at 160° C. for 12 hours. On this occasion, the reaction solution turned from colorless clear to green. Further 2.50 g (24.5 mmol) of pivalic acid was added to the solution, which was stirred at 160° C. for 19 hours. Thereafter, the reaction solution was filtered, and the filtrate was combined with the recovered supernatant and dried in vacuum at 80° C. The resulting solid was washed with hexane, obtaining a green solid (2.66 g, yield 67%).

FT-IR (KBr) v: 2963, 2930, 2868, 1583, 1523, 1485, 1457, 1427, 1379, 1362, 1229, 1031, 938, 900, 790, 608, 576, 457 cm$^{-1}$

[Synthesis Example 2] Synthesis of Cobalt Pivalate

With reference to Russ. Chem. Bull., 1999, 48, 1751, the compound was synthesized by the following procedure.

A 50 mL two-necked round-bottomed flask equipped with a reflux condenser was charged with 1.15 g (6.5 mmol) of cobalt acetate, 1.55 g (15.2 mmol) of pivalic acid, and 0.5 mL (2.5 mmol) of pivalic anhydride, which were stirred at 160° C. for 1 hour. On this occasion, the reaction solution turned from thin purple to purple. Thereafter, the reaction solution was vacuum dried at 80° C. The resulting solid was washed with pentane and diethyl ether and dried, obtaining a purple solid (1.15 g, yield 68%).

FT-IR (KBr) v: 2963, 2929, 2868, 1599, 1524, 1485, 1457, 1420, 1379, 1363, 1229, 1032, 938, 900, 792, 613, 585, 460 cm$^{-1}$

[Synthesis Example 3] Synthesis of Cobalt Carboxylate A

A 1 L flask equipped with a reflux condenser was charged with 184.0 g (1.0 mol) of 10-undecylenic acid and 150.0 g of toluene, which were heated at 80° C. To the solution, 100.6 g (0.625 mol) of hexamethyldisilazane was added dropwise. After the addition, the solution was heated at 80°

C. for a further 3 hours. The solution was heated at 100° C. under reduced pressure to evaporate off the volatile components, obtaining $CH_2=CH(CH_2)_8COOSiMe_3$ (Silylated compound A) (254.4 g, yield 99.4%).

A 1 L flask equipped with a reflux condenser was charged with 254.4 g (0.99 mol) of Silylated compound A and 100.0 g of toluene, which were heated at 90° C. To the solution, 0.5 g of a 0.5 wt % toluene solution of chloroplatinic acid was added, and 264.7 g (1.19 mol) of 1,1,1,3,5,5,5-heptamethyltrisiloxane was added dropwise. After the addition, the solution was heated at 100° C. for a further 2 hours. The volatile was removed by heating at 120° C. under reduced pressure, obtaining $(Me_3SiO)_2MeSi(CH_2)_{10}COOSiMe_3$ (Addition compound B) (451.2 g, yield 95.0%).

A 1 L flask was charged with 239.0 g (0.5 mol) of Addition compound B and 140.0 g of methanol, which were stirred at room temperature for 14 hours. By distillation, the target compound: $(Me_3SiO)_2MeSi(CH_2)_{10}COOH$ was obtained (b.p. 175.0-176.0° C./0.3 kPa, 162.4 g, yield 80.0%). It had a purity of 99.5% as analyzed by gas chromatography.

Next, a 20 mL recovery flask was charged with 0.43 g (2.41 mmol) of cobalt acetate and 2.0 g (4.92 mmol) of the above synthesized $(Me_3SiO)_2MeSi(CH_2)_{10}COOH$, which were stirred at 180° C. for 1 hour. Thereafter, the product was vacuum dried at the temperature for 1 hour, obtaining Cobalt carboxylate A.

FT-IR (KBr) ν: 2958, 2924, 2583, 1555, 1413, 1257, 1078, 1049, 842, 799, 783, 754, 687 cm$^{-1}$

[Synthesis Example 4] Synthesis of Cobalt Carboxylate B

A 500 mL flask equipped with a reflux condenser was charged with 100.0 g (1.16 mol) of 3-butenoic acid and 80.0 g of hexane and heated at 70° C. To the solution, 117.0 g (0.73 mol) of hexamethyldisilazane was added dropwise. After the completion of dropwise addition, the solution was heated at 70° C. for a further 3 hours. The reaction solution was distilled, obtaining the desired compound: $CH_2=CHCH_2COOSiMe_3$ (Silylated compound B) (b.p. 60.0-62.0° C./5.3 kPa, amount 155.1 g, yield 84.6%). It had a purity of 94.4% as analyzed by gas chromatography.

A 500 mL flask equipped with a reflux condenser was charged with 155.1 g (0.98 mol) of Silylated compound B and 150.0 g of toluene and heated at 90° C. To the solution, 0.5 g of a 0.5 wt % toluene solution of chloroplatinic acid was added, and 239.8 g (1.08 mol) of 1,1,1,3,5,5,5-heptamethyltrisiloxane was added dropwise. After the completion of dropwise addition, the solution was heated at 100° C. for a further 2 hours. The reaction solution was distilled, obtaining the desired compound: $(Me_3SiO)_2MeSi(CH_2)_3COOSiMe_3$ (Addition compound B) (b.p. 97.0-98.5° C./0.3 kPa, amount 253.8 g, yield 68.1%). It had a purity of 98.7% as analyzed by gas chromatography.

Next, a 500 mL flask was charged with 207.5 g (0.55 mol) of Addition compound B and 100.0 g of methanol, which were stirred at room temperature for 14 hours. By distillation, the target compound: $(Me_3SiO)_2MeSi(CH_2)_3COOH$ was obtained (b.p. 119.5-121.0° C./0.3 kPa, amount 109.5 g, yield 64.6%). It had a purity of 98.6% as analyzed by gas chromatography.

Then a 20 mL recovery flask was charged with 0.20 g (1.13 mmol) of cobalt acetate and 0.70 g (2.28 mmol) of $(Me_3SiO)_2MeSi(CH_2)_3COOH$, which were stirred at 160° C. for 1 hour. Thereafter, the product was vacuum dried at the temperature for 1 hour, obtaining Cobalt carboxylate B (amount 0.40 g).

FT-IR (KBr) ν: 2958, 2901, 2880, 1686, 1561, 1413, 1259, 1176, 1078, 1041, 842, 797, 755 cm$^{-1}$

[Synthesis Example 5] Synthesis of Cobalt Carboxylate C

A 1 L flask equipped with a reflux condenser was charged with 184.0 g (1.0 mol) of 10-undecylenic acid and 150.0 g of toluene and heated at 80° C. To the solution, 100.6 g (0.625 mol) of hexamethyldisilazane was added dropwise. After the completion of dropwise addition, the solution was heated at 80° C. for a further 3 hours. The volatile was removed by heating at 100° C. under reduced pressure, obtaining $CH_2=CH(CH_2)_8COOSiMe_3$ (same as the above Silylated compound A) (amount 254.3 g, yield 99.3%).

A 1 L flask equipped with a reflux condenser was charged with 51.2 g (0.20 mol) of Silylated compound A and heated at 90° C. To the flask, 0.2 g of a 0.5 wt % toluene solution of chloroplatinic acid was added, and 94.5 g (0.23 mol) of $nBu(Me_2)SiO(Me_2SiO)_3Si(Me_2)H$ was added dropwise. After the completion of dropwise addition, the solution was heated at 100° C. for a further 2 hours. The unreacted compounds were removed by heating at 200° C. under reduced pressure, obtaining the desired compound: $nBu(Me_2)SiO(Me_2SiO)_3Si(Me_2)(CH_2)_{10}COOSiMe_3$ (Addition compound C) (amount 127.0 g, yield 95.0%).

A 500 mL flask was charged with 127.0 g (0.19 mol) of Addition compound C and 100.0 g of methanol, which were stirred at room temperature for 14 hours. The volatiles were removed by heating at 100° C. under reduced pressure, obtaining the desired compound: $nBu(Me_2)SiO(Me_2SiO)_3Si(Me_2)(CH_2)_{10}COOH$ (amount 111.0 g, yield 98.0%). It had a purity of 99.8% as analyzed by gas chromatography.

Then a 20 mL recovery flask was charged with 0.20 g (1.13 mmol) of cobalt acetate and 1.35 g (2.26 mmol) of $nBu(Me_2)SiO(Me_2SiO)_3Si(Me_2)(CH_2)_{10}COOH$, which were stirred at 160° C. for 1 hour. Thereafter, the product was vacuum dried at the temperature for 1 hour, obtaining Cobalt carboxylate C.

FT-IR (KBr) ν: 2960, 2924, 2854, 1560, 1457, 1412, 1259, 1088, 1037, 840, 798 cm$^{-1}$

A 500 mL flask was charged with 127.0 g (0.19 mol) of Addition compound C and 100.0 g of methanol, which were stirred at room temperature for 14 hours. The volatiles were removed by heating at 100° C. under reduced pressure, obtaining the desired compound: $nBu(Me_2)SiO(Me_2SiO)_3Si(Me_2)(CH_2)_{10}COOH$ (amount 111.0 g, yield 98.0%). It had a purity of 99.8% as analyzed by gas chromatography.

Then a 20 mL recovery flask was charged with 0.20 g (1.13 mmol) of cobalt acetate and 1.35 g (2.26 mmol) of $nBu(Me_2)SiO(Me_2SiO)_3Si(Me_2)(CH_2)_{10}COOH$, which were stirred at 160° C. for 1 hour. Thereafter, the product was vacuum dried at the temperature for 1 hour, obtaining Cobalt carboxylate C.

FT-IR (KBr) ν: 2960, 2924, 2854, 1560, 1457, 1412, 1259, 1088, 1037, 840, 798

[Synthesis Example 6] Synthesis of bis(trimethylsilyl)methyl isocyanide and tris(trimethylsilyl)methyl isocyanide With reference to the non-patent document (J. Organomet. Chem, 1970, 25, 385), synthesis was performed by the following procedure.

A 50 mL Schlenk flask was charged with 500 mg (4.42 mmol) of trimethylsilylmethyl isocyanide purchased as commercial product, which was dissolved in 25 mL of THF. The solution was cooled at −78° C., after which 4.10 mL (4.55 mmol) of 1.11M lithium diisopropylamide in a THF/hexane mixture was added to the solution, which was stirred for 10 minutes. Then, 0.58 mL (4.59 mmol) of chlorotrimethylsilane was added to the solution, which was stirred at −78° C. for 2 hours. The solution was warmed back to room temperature, the solvent was distilled off, 25 mL of hexane was added, the precipitate was removed by filtration, and the solvent and unreacted isocyanide were distilled off under reduced pressure again. This was followed by distillation at 60° C. under a reduced pressure of 10 Pa, obtaining bis(trimethylsilyl)methyl isocyanide (87 mg, 11%). This was followed by sublimation purification at 80° C. under a reduced pressure of 10 Pa, obtaining tris(trimethylsilyl)methyl isocyanide (440 mg, 38%).

bis(trimethylsilyl)methyl isocyanide $^1$H-NMR (396 MHz, CDCl$_3$) δ: 0.18 (s, 18H), 2.52 (t, J=2.4 Hz, 1H).

$^{13}$C-NMR (151 MHz, CDCl$_3$) δ: 13.8, 43.7, 137.8 (t, J=4.6 Hz).

$^{29}$Si-NMR (119 MHz, CDCl$_3$) δ: 4.82.

FT-IR (neat) ν: 2116 (CN-) cm$^{-1}$ tris(trimethylsilyl)methyl isocyanide $^1$H-NMR (396 MHz, CDCl$_3$) δ: 0.22 (s, 27H).

$^{13}$C-NMR (151 MHz, CDCl$_3$) δ: 0.08, 33.4, 151.6 (t, J=4.6 Hz).

$^{29}$Si-NMR (119 MHz, CDCl$_3$) δ: 5.55.

FT-IR (KBr) ν: 2090 (CN-) cm$^{-1}$

[Synthesis Example 7] Synthesis of Ru$_2$(μ-OAc)$_4$Cl

With reference to the document (J. Inorg. Nucl. Chem., 1966, 28, 2285), synthesis was performed by the following procedure.

A 200 mL two-necked round-bottomed flask was charged with 1.09 g (4.18 mmol) of RuCl$_3$ trihydrate, 35 mL of glacial acetic acid, and 7 mL of acetic anhydride, which were stirred at 145° C. for 2 hours. The solution was once cooled and filtered, after which it was stirred again at 145° C. for 6 hours. This was followed by crystallization at −30° C. and washing with glacial acetic acid, methanol, and diethyl ether, obtaining a reddish brown solid (61 mg, yield 6%).

FT-IR (KBr) ν: 3023, 2991, 2934, 1643, 1444, 1401, 1356, 1041, 1356, 1041, 1015, 944, 691, 625, 606 cm$^{-1}$

[Example 1] Synthesis of Isocyanide L-1

The compound was synthesized by the following procedure while conducting N-formylation of an amine compound with reference to Org. Synth., 2013, 90, 358-366 and conversion of an N-formylated compound to isocyanide with reference to Organometallics, 2004, 23, 3976-3981.

A 300 mL flask was charged with 57.1 g (0.56 mol) of acetic anhydride and cooled to an internal temperature of 5° C. To the flask, 51.5 g (1.12 mol) of formic acid was added dropwise. The contents were stirred for 30 minutes with the flask kept cool, further stirred for 2 hours at an internal temperature of 40° C., and cooled to room temperature.

A 500 mL flask was charged with 106.0 g (0.30 mol) of 3-aminopropyl-tristrimethylsiloxysilane and 120.0 g of THF and cooled to an internal temperature of −15° C. The reaction solution prepared above was added dropwise to the flask at such a rate that the internal temperature might not exceed −5° C. After the completion of dropwise addition, stirring was continued at −15° C. for a further 2 hours. Then the volatile was evaporated, obtaining 118.2 g of a N-formylated crude product.

A 2 L flask was charged with 118.2 g of the N-formylated product, 120.0 g of methylene chloride, and 109.5 g (1.08 mol) of diisopropylamine, and cooled to an internal temperature of 5° C. To the flask, 52.3 g (0.34 mol) of phosphoryl chloride was added dropwise. The contents were stirred for 2 hours with the flask kept cool. Then 750.0 g of 20 wt % sodium carbonate aqueous solution was added dropwise such that the internal temperature might not exceed 20° C. After the completion of dropwise addition, the solution was stirred at room temperature for 15 hours. The resulting salt was filtered off and the water layer was separated. The organic layer was washed with water 3 times, dried over magnesium sulfate, filtered, and distilled, obtaining the target compound: (Me$_3$SiO)$_3$SiCH$_2$CH$_2$CH$_2$NC (amount 62.7 g, yield 57.6%, b.p. 95.5-96.0° C./0.3 kPa). It had a purity of 99.6% as analyzed by gas chromatography.

[Example 2] Synthesis of Isocyanide L-2

The compound was synthesized by the same procedure as in Example 1.

A 300 mL flask was charged with 26.5 g (0.26 mol) of acetic anhydride and cooled to an internal temperature of 5° C. To the flask, 23.9 g (0.52 mol) of formic acid was added dropwise. The contents were stirred for 30 minutes with the flask kept cool, further stirred for 2 hours at an internal temperature of 40° C., and cooled to room temperature.

A 500 mL flask was charged with 65.4 g (0.14 mol) of nBu(Me$_2$)SiO(Me$_2$SiO)$_3$Si(Me$_2$)CH$_2$CH$_2$CH$_2$NH$_2$ and 100.0 g of tetrahydrofuran and cooled to an internal temperature of −15° C. The reaction solution prepared above was added dropwise to the flask at such a rate that the internal temperature might not exceed −5° C. After the completion of dropwise addition, stirring was continued at −15° C. for a further 2 hours. Then the volatile was evaporated, obtaining 69.1 g of a N-formylated crude product.

A 1 L flask was charged with 69.1 g of the N-formylated product, 120.0 g of methylene chloride, and 49.3 g (0.49 mol) of diisopropylamine, and cooled to an internal temperature of 5° C. To the flask, 23.6 g (0.15 mol) of phosphoryl chloride was added dropwise. The contents were stirred for 2 hours with the flask kept cool. Then 350.0 g of 20 wt % sodium carbonate aqueous solution was added dropwise such that the internal temperature might not exceed 20° C. After the completion of dropwise addition, the solution was stirred at room temperature for 15 hours. The resulting salt was filtered off and the water layer was separated. The organic layer was washed with water 3 times, dried over magnesium sulfate, filtered, and distilled, obtaining the target compound: nBu(Me$_2$)SiO(Me$_2$SiO)$_3$Si(Me$_2$)CH$_2$CH$_2$CH$_2$NC (amount 52.2 g, yield 77.8%, b.p. 145-147° C./0.3 kPa). It had a purity of 97.2% as analyzed by gas chromatography.

[Example 3] Synthesis of Isocyanide L-3

The compound was synthesized by the same procedure as in Example 1.

A 300 mL flask was charged with 57.1 g (0.56 mol) of acetic anhydride and cooled to an internal temperature of 5° C. To the flask, 51.5 g (1.12 mol) of formic acid was added dropwise. The contents were stirred for 30 minutes with the flask kept cool, further stirred for 2 hours at an internal temperature of 40° C., and cooled to room temperature.

A 500 mL flask was charged with 37.2 g (0.15 mol) of H$_2$NCH$_2$CH$_2$CH$_2$(Me$_2$)SiOSi(Me$_2$)CH$_2$CH$_2$CH$_2$NH$_2$ and 100.0 g of tetrahydrofuran and cooled to an internal temperature of −15° C. The reaction solution prepared above was added dropwise to the flask at such a rate that the internal temperature might not exceed −5° C. After the completion of dropwise addition, stirring was continued at −15° C. for a further 2 hours. Then the volatile was evaporated, obtaining 46.7 g of a N-formylated crude product.

A 2 L flask was charged with 46.7 g of the N-formylated product, 120.0 g of methylene chloride, and 106.1 g (1.05 mol) of diisopropylamine, and cooled to an internal temperature of 5° C. To the flask, 50.7 g (0.33 mol) of phosphoryl chloride was added dropwise. The contents were stirred for 2 hours with the flask kept cool. Then 750.0 g of 20 wt % sodium carbonate aqueous solution was added dropwise such that the internal temperature might not exceed 20° C. After the completion of dropwise addition, the solution was stirred at room temperature for 15 hours. The resulting salt was filtered off and the water layer was separated. The organic layer was washed with water 3 times, dried over magnesium sulfate, filtered, and distilled, obtaining the target compound: CNCH$_2$CH$_2$CH$_2$(Me$_2$)SiOSi(Me$_2$)CH$_2$CH$_2$CH$_2$NC. Amount 17.4 g, yield 43.3%, b.p. 133-134° C./0.3 kPa. It had a purity of 97.8% as analyzed by gas chromatography.

(1) Reaction of Pentamethyldisiloxane with Styrene

[Chem. 4]

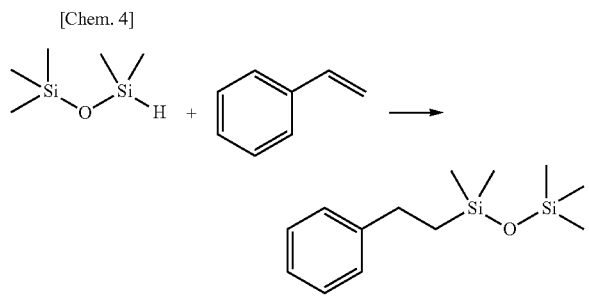

Example 4

A screw-capped vial was charged with 3 mg (0.01 mmol) of iron pivalate obtained in Synthesis Example 1 as catalyst, 7 mg (0.02 mmol) of Isocyanide L-1 obtained in Example 1 as isocyanide ligand, 254 μL (1.3 mmol) of 1,1,1,3,3-pentamethyldisiloxane as hydrosiloxane, and 115 μL (1.0 mmol) of styrene, which were stirred at 50° C. for 3 hours. After cooling, 1.0 mmol of anisole as an internal standard was added to the reaction solution and stirred. A minute amount of the solution was dissolved in deuteronchloroform, passed through an alumina column to remove the catalyst, and analyzed by $^1$H-NMR spectroscopy to determine the structure and yield of the product. (It is noted that in the following Examples, the determination of a yield by $^1$H-NMR spectroscopy is similarly performed in this procedure.) As a result, it was confirmed that the signals assigned to the reactants disappeared completely. Instead, a multiplet at 0.89 ppm indicative of the signal assigned to proton on silicon-adjoining carbon in the desired product was observed, and the yield was determined. As a result, the yield was 70%.

$^1$H-NMR (396 MHz, CDCl$_3$) δ: 0.07 (s, 6H), 0.09 (s, 9H), 0.86-0.92 (m, 2H), 2.61-2.68 (m, 2H), 7.13-7.33 (m, 5H)

Example 5

A screw-capped vial was charged with 3 mg (0.01 mmol) of iron pivalate obtained in Synthesis Example 1 as catalyst, 9 mg (0.02 mmol) of Isocyanide L-2 obtained in Example 2 as isocyanide ligand, 254 μL (1.3 mmol) of 1,1,1,3,3-pentamethyldisiloxane as hydrosiloxane, and 115 μL (1.0 mmol) of styrene, which were stirred at 50° C. for 3 hours. After cooling, the product was analyzed by $^1$H-NMR spectroscopy to determine its yield. As a result, the yield was >99%.

Example 6

A screw-capped vial was charged with 3 mg (0.01 mmol) of iron pivalate obtained in Synthesis Example 1 as catalyst, 3 mg (0.01 mmol) of Isocyanide L-3 obtained in Example 3 as isocyanide ligand, 254 μL (1.3 mmol) of 1,1,1,3,3-pentamethyldisiloxane as hydrosiloxane, and 115 μL (1.0 mmol) of styrene, which were stirred at 50° C. for 3 hours. After cooling, the product was analyzed by $^1$H-NMR spectroscopy to determine its yield. As a result, the yield was >99%.

Example 7

A screw-capped vial was charged with 3 mg (0.01 mmol) of iron pivalate obtained in Synthesis Example 1 as catalyst, 2 mg (0.02 mmol) of commercially available trimethylsilylmethyl isocyanide as isocyanide ligand, 254 μL (1.3 mmol) of 1,1,1,3,3-pentamethyldisiloxane as hydrosiloxane, and 115 μL (1.0 mmol) of styrene, which were stirred at 50° C. for 3 hours. After cooling, the product was analyzed by $^1$H-NMR spectroscopy to determine its yield. As a result, the yield was 95%.

Example 8

A reactor was charged with 12 mg (0.01 mmol) of iridium acetate (by Alfa Aesar Co.), 22 mg (0.06 mmol) of Isocyanide L-1 obtained in Example 1 as isocyanide ligand, 254 μL (1.3 mmol) of 1,1,1,3,3-pentamethyldisiloxane as hydrosiloxane, and 115 μL (1.0 mmol) of styrene, which were stirred at 80° C. for 24 hours. After cooling, the product was analyzed by $^1$H-NMR spectroscopy to determine its yield. As a result, the yield of hydrosilylated product was 9%.

Example 9

A reactor was charged with 7 mg (0.03 mmol) of commercially available palladium acetate, 22 mg (0.06 mmol) of Isocyanide L-1 obtained in Example 1 as isocyanide ligand, 254 μL (1.3 mmol) of 1,1,1,3,3-pentamethyldisiloxane as hydrosiloxane, and 115 μL (1.0 mmol) of styrene, which were stirred at 80° C. for 24 hours. After cooling, the product was analyzed by $^1$H-NMR spectroscopy to determine its yield. As a result, the yield of hydrosilylated product was 30%.

Example 10

A reactor was charged with 7 mg (0.005 mmol) of Ru$_2$(μ-OAc)$_4$Cl obtained in Synthesis Example 7, 22 mg (0.06 mmol) of Isocyanide L-1 obtained in Example 1 as isocyanide ligand, 254 μL (1.3 mmol) of 1,1,1,3,3-pentamethyldisiloxane as hydrosiloxane, and 115 μL (1.0 mmol) of styrene, which were stirred at 80° C. for 24 hours. After cooling, the product was analyzed by $^1$H-NMR spectroscopy to determine its yield. As a result, the yield of hydrosilylated product was 10%.

(2) Reaction of Pentamethyldisiloxane with α-Methylstyrene

[Chem. 5]

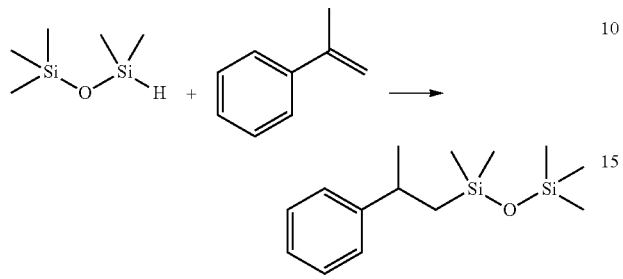

Example 11

A screw-capped vial was charged with 3 mg (0.01 mmol) of cobalt pivalate obtained in Synthesis Example 2 as catalyst, 11 mg (0.03 mmol) of Isocyanide L-1 obtained in Example 1 as isocyanide ligand, 254 μL (1.3 mmol) of 1,1,1,3,3-pentamethyldisiloxane as hydrosiloxane, and 130 μL (1.0 mmol) of α-methylstyrene, which were stirred at 80° C. for 3 hours. After cooling, the product was analyzed by $^1$H-NMR spectroscopy to determine its structure and yield. As a result, it was confirmed that the signals assigned to the reactants disappeared completely. Instead, a multiplet near 0.95 ppm indicative of the signal assigned to proton on silicon-adjoining carbon in the desired product was observed, and the yield was determined. As a result, the yield was >99%.

$^1$H-NMR (396 MHz, CDCl$_3$) δ: −0.07 (s, 3H), −0.06 (s, 3H), 0.05 (s, 9H), 0.89-1.00 (m, 2H), 1.28 (d, J=7.3 Hz, 3H), 2.91 (tq, J=6.8 Hz, J=7.3 Hz, 1H), 7.13-7.32 (m, 5H)

Example 12

A screw-capped vial was charged with 3 mg (0.01 mmol) of cobalt pivalate obtained in Synthesis Example 2 as catalyst, 14 mg (0.03 mmol) of Isocyanide L-2 obtained in Example 2 as isocyanide ligand, 254 μL (1.3 mmol) of 1,1,1,3,3-pentamethyldisiloxane as hydrosiloxane, and 130 μL (1.0 mmol) of α-methylstyrene, which were stirred at 80° C. for 3 hours. After cooling, the product was analyzed by $^1$H-NMR spectroscopy to determine its yield. As a result, the yield was >99%.

[Example 13] Hydrosilylation Reaction Using Cobalt Pivalate and Isocyanide L-3

A screw-capped vial was charged with 3 mg (0.01 mmol) of cobalt pivalate obtained in Synthesis Example 2 as catalyst, 4 mg (0.015 mmol) of Isocyanide L-3 obtained in Example 3 as isocyanide ligand, 254 μL (1.3 mmol) of 1,1,1,3,3-pentamethyldisiloxane as hydrosiloxane, and 130 μL (1.0 mmol) of α-methylstyrene, which were stirred at 80° C. for 3 hours. After cooling, the product was analyzed by $^1$H-NMR spectroscopy to determine its yield. As a result, the yield was 63%.

Example 14

A screw-capped vial was charged with 3 mg (0.01 mmol) of cobalt pivalate obtained in Synthesis Example 2 as catalyst, 3 mg (0.03 mmol) of commercially available trimethylsilylmethyl isocyanide as isocyanide ligand, 254 μL (1.3 mmol) of 1,1,1,3,3-pentamethyldisiloxane as hydrosiloxane, and 130 μL (1.0 mmol) of α-methylstyrene, which were stirred at 80° C. for 3 hours. After cooling, the product was analyzed by $^1$H-NMR spectroscopy to determine its yield. As a result, the yield was 51%.

Example 15

A screw-capped vial was charged with 3 mg (0.01 mmol) of cobalt pivalate obtained in Synthesis Example 2 as catalyst, 6 mg (0.03 mmol) of bis(trimethylsilyl)methyl isocyanide obtained in Synthesis Example 6 as isocyanide ligand, 254 μL (1.3 mmol) of 1,1,1,3,3-pentamethyldisiloxane as hydrosiloxane, and 130 μL (1.0 mmol) of α-methylstyrene, which were stirred at 80° C. for 3 hours. After cooling, the product was analyzed by $^1$H-NMR spectroscopy to determine its yield. As a result, the yield was 94%.

Example 16

A screw-capped vial was charged with 3 mg (0.01 mmol) of cobalt pivalate obtained in Synthesis Example 2 as catalyst, 8 mg (0.04 mmol) of tris(trimethylsilyl)methyl isocyanide obtained in Synthesis Example 6 as isocyanide ligand, 254 μL (1.3 mmol) of 1,1,1,3,3-pentamethyldisiloxane as hydrosiloxane, and 130 μL (1.0 mmol) of α-methylstyrene, which were stirred at 80° C. for 3 hours. After cooling, the product was analyzed by $^1$H-NMR spectroscopy to determine its yield. As a result, the yield was 63%.

Example 17

A reactor was charged with 7 mg (0.01 mmol) of Cobalt carboxylate B obtained in Synthesis Example 4 as catalyst, 11 mg (0.03 mmol) of Isocyanide L-1 obtained in Example 1 as isocyanide ligand, and 100 μL of DME, which were stirred for 15 minutes. Then 254 μL (1.3 mmol) of 1,1,1,3,3-pentamethyldisiloxane as hydrosiloxane and 130 μL (1.0 mmol) of α-methylstyrene were added, followed by stirring at 80° C. for 43 hours. After cooling, the product was analyzed by $^1$H-NMR spectroscopy to determine its yield. As a result, the yield was >99%.

(3) Reaction of Methylhydrogenpolysiloxane with α-Methylstyrene

[Chem. 6]

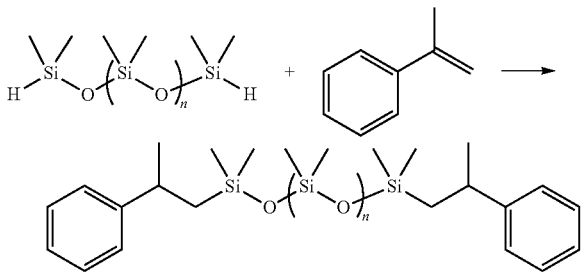

Example 18

A reactor was charged with 3 mg (0.01 mmol) of cobalt pivalate obtained in Synthesis Example 2 as catalyst, 11 mg (0.03 mmol) of Isocyanide L-1 obtained in Example 1 as isocyanide ligand, 1.07 g (0.5 mmol) of both end hydrodimethylsilyl-capped polydimethylsiloxane (average degree of polymerization (DOP) 27) as hydrosiloxane, and 130 μL (1.0 mmol) of α-methylstyrene, which were stirred at 80° C. for 3 hours. After cooling, the product was analyzed by $^1$H-NMR spectroscopy to determine its yield. As a result, the yield was 95%.

Example 19

A reactor was charged with 9 mg (0.01 mmol) of Cobalt carboxylate A obtained in Synthesis Example 3 as catalyst, 11 mg (0.03 mmol) of Isocyanide L-1 obtained in Example 1 as isocyanide ligand, 1.47 g (1.0 mmol) of both end hydrodimethylsilyl-capped polydimethylsiloxane (average DOP 18) as hydrosiloxane, and 169 μL (1.3 mmol) of α-methylstyrene, which were stirred at 80° C. for 3 hours. After cooling, the product was analyzed by $^1$H-NMR spectroscopy to determine its yield. As a result, the yield was 46%.

Example 20

A reactor was charged with 9 mg (0.01 mmol) of Cobalt carboxylate A obtained in Synthesis Example 3 as catalyst, 14 mg (0.03 mmol) of Isocyanide L-2 obtained in Example 2 as isocyanide ligand, 1.47 g (1.0 mmol) of both end hydrodimethylsilyl-capped polydimethylsiloxane (average DOP 18) as hydrosiloxane, and 169 μL (1.3 mmol) of α-methylstyrene, which were stirred at 80° C. for 3 hours. After cooling, the product was analyzed by $^1$H-NMR spectroscopy to determine its yield. As a result, the yield was 46%.

Example 21

A reactor was charged with 9 mg (0.01 mmol) of Cobalt carboxylate A obtained in Synthesis Example 3 as catalyst, 4 mg (0.015 mmol) of Isocyanide L-3 obtained in Example 3 as isocyanide ligand, 1.47 g (1.0 mmol) of both end hydrodimethylsilyl-capped polydimethylsiloxane (average DOP 18) as hydrosiloxane, and 169 μL (1.3 mmol) of α-methylstyrene, which were stirred at 80° C. for 3 hours. After cooling, the product was analyzed by $^1$H-NMR spectroscopy to determine its yield. As a result, the yield was 20%.

Example 22

A reactor was charged with 12 mg (0.01 mmol) of Cobalt carboxylate C obtained in Synthesis Example 5 as catalyst, 11 mg (0.03 mmol) of Isocyanide L-1 obtained in Example 1 as isocyanide ligand, 1.47 g (1.0 mmol) of both end hydrodimethylsilyl-capped polydimethylsiloxane (average DOP 18) as hydrosiloxane, and 169 μL (1.3 mmol) of α-methylstyrene, which were stirred at 80° C. for 3 hours. After cooling, the product was analyzed by $^1$H-NMR spectroscopy to determine its yield. As a result, the yield was 42%.

Example 23

A reactor was charged with 12 mg (0.01 mmol) of Cobalt carboxylate C obtained in Synthesis Example 5 as catalyst, 14 mg (0.03 mmol) of Isocyanide L-2 obtained in Example 2 as isocyanide ligand, 1.47 g (1.0 mmol) of both end hydrodimethylsilyl-capped polydimethylsiloxane (average DOP 18) as hydrosiloxane, and 169 μL (1.3 mmol) of α-methylstyrene, which were stirred at 80° C. for 3 hours. After cooling, the product was analyzed by $^1$H-NMR spectroscopy to determine its yield. As a result, the yield was 76%.

Example 24

A reactor was charged with 12 mg (0.01 mmol) of Cobalt carboxylate C obtained in Synthesis Example 5 as catalyst, 4 mg (0.015 mmol) of Isocyanide L-3 obtained in Example 3 as isocyanide ligand, 1.47 g (1.0 mmol) of both end hydrodimethylsilyl-capped polydimethylsiloxane (average DOP 18) as hydrosiloxane, and 169 μL (1.3 mmol) of α-methylstyrene, which were stirred at 80° C. for 3 hours. After cooling, the product was analyzed by $^1$H-NMR spectroscopy to determine its yield. As a result, the yield was 29%.

Example 25

A reactor was charged with 3 mg (0.01 mmol) of cobalt pivalate obtained in Synthesis Example 2 as catalyst, 3 mg (0.03 mmol) of commercially available trimethylsilylmethyl isocyanide as isocyanide ligand, 1.07 g (0.5 mmol) of both end hydrodimethylsilyl-capped polydimethylsiloxane (average DOP 27) as hydrosiloxane, and 169 μL (1.3 mmol) of α-methylstyrene, which were stirred at 80° C. for 3 hours. After cooling, the product was analyzed by $^1$H-NMR spectroscopy to determine its yield. As a result, the yield was 25%.

Example 26

A reactor was charged with 3 mg (0.01 mmol) of cobalt pivalate obtained in Synthesis Example 2 as catalyst, 6 mg (0.03 mmol) of bis(trimethylsilyl)methyl isocyanide obtained in Synthesis Example 6 as isocyanide ligand, 1.07 g (0.5 mmol) of both end hydrodimethylsilyl-capped polydimethylsiloxane (average DOP 27) as hydrosiloxane, and 169 μL (1.3 mmol) of α-methylstyrene, which were stirred at 80° C. for 3 hours. After cooling, the product was analyzed by $^1$H-NMR spectroscopy to determine its yield. As a result, the yield was 80%.

Example 27

A reactor was charged with 3 mg (0.01 mmol) of cobalt pivalate obtained in Synthesis Example 2 as catalyst, 8 mg (0.03 mmol) of tris(trimethylsilyl)methyl isocyanide obtained in Synthesis Example 6 as isocyanide ligand, 1.07 g (0.5 mmol) of both end hydrodimethylsilyl-capped polydimethylsiloxane (average DOP 27) as hydrosiloxane, and 169 μL (1.3 mmol) of α-methylstyrene, which were stirred at 80° C. for 3 hours. After cooling, the product was analyzed by $^1$H-NMR spectroscopy to determine its yield. As a result, the yield was 20%.

Comparative Example 1

A reactor was charged with 3 mg (0.01 mmol) of cobalt pivalate obtained in Synthesis Example 2 as catalyst, 5 mg (0.03 mmol) of 1-isocyanoadamantane, 130 μL (1.0 mmol) of α-methylstyrene, and 1.07 g (0.5 mmol) of both end hydrodimethylsilyl-capped polydimethylsiloxane (average DOP 27), which were stirred at 80° C. for 3 hours. After cooling, the product was analyzed by ¹H-NMR spectroscopy to determine its yield. As a result, the yield was 0%.

(4) Reaction of Methylhydrogenpolysiloxane with Styrene

[Chem. 7]

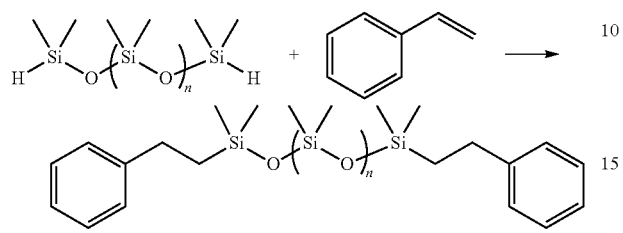

Example 28

A reactor was charged with 3 mg (0.01 mmol) of iron pivalate obtained in Synthesis Example 1 as catalyst, 7 mg (0.02 mmol) of Isocyanide L-1 obtained in Example 1 as isocyanide ligand, 1.07 g (0.5 mmol) of both end hydrodimethylsilyl-capped polydimethylsiloxane (average DOP 27) as hydrosiloxane, and 149 μL (1.3 mmol) of styrene, which were stirred at 50° C. for 3 hours. After cooling, the product was analyzed by ¹H-NMR spectroscopy to determine its yield. As a result, the yield was 75%.

Example 29

A reactor was charged with 3 mg (0.01 mmol) of iron pivalate obtained in Synthesis Example 1 as catalyst, 10 mg (0.02 mmol) of Isocyanide L-2 obtained in Example 2 as isocyanide ligand, 1.07 g (0.5 mmol) of both end hydrodimethylsilyl-capped polydimethylsiloxane (average DOP 27) as hydrosiloxane, and 149 μL (1.3 mmol) of styrene, which were stirred at 50° C. for 3 hours. After cooling, the product was analyzed by ¹H-NMR spectroscopy to determine its yield. As a result, the yield was 12%.

Example 30

A reactor was charged with 3 mg (0.01 mmol) of iron pivalate obtained in Synthesis Example 1 as catalyst, 3 mg (0.01 mmol) of Isocyanide L-3 obtained in Example 3 as isocyanide ligand, 1.07 g (0.5 mmol) of both end hydrodimethylsilyl-capped polydimethylsiloxane (average DOP 27) as hydrosiloxane, and 149 μL (1.3 mmol) of styrene, which were stirred at 25° C. for 3 hours. After cooling, the product was analyzed by ¹H-NMR spectroscopy to determine its yield. As a result, the yield was 11%.

Example 31

A reactor was charged with 3 mg (0.01 mmol) of iron pivalate obtained in Synthesis Example 1 as catalyst, 2 mg (0.02 mmol) of commercially available trimethylsilylmethyl isocyanide as isocyanide ligand, 1.07 g (0.5 mmol) of both end hydrodimethylsilyl-capped polydimethylsiloxane (average DOP 27) as hydrosiloxane, and 149 μL (1.3 mmol) of styrene, which were stirred at 50° C. for 3 hours. After cooling, the product was analyzed by ¹H-NMR spectroscopy to determine its yield. As a result, the yield was 74%.

Example 32

A reactor was charged with 3 mg (0.01 mmol) of iron pivalate obtained in Synthesis Example 1 as catalyst, 4 mg (0.02 mmol) of bis(trimethylsilyl)methyl isocyanide obtained in Synthesis Example 6 as isocyanide ligand, 1.07 g (0.5 mmol) of both end hydrodimethylsilyl-capped polydimethylsiloxane (average DOP 27) as hydrosiloxane, and 149 μL (1.3 mmol) of styrene, which were stirred at 50° C. for 3 hours. After cooling, the product was analyzed by ¹H-NMR spectroscopy to determine its yield. As a result, the yield was 6%.

Comparative Example 2

A reactor was charged with 3 mg (0.01 mmol) of iron pivalate obtained in Synthesis Example 1 as catalyst, 3 mg (0.02 mmol) of 1-isocyanoadamantane, 115 μL (1.0 mmol) of styrene, and 1.07 g (0.5 mmol) of both end hydrodimethylsilyl-capped polydimethylsiloxane (average DOP 27), which were stirred at 50° C. for 3 hours. After cooling, the product was analyzed by ¹H-NMR spectroscopy to determine its yield. As a result, the yield was 0%.

(5) Reaction of Heptamethyltrisiloxane with 1-Octene

[Chem. 8]

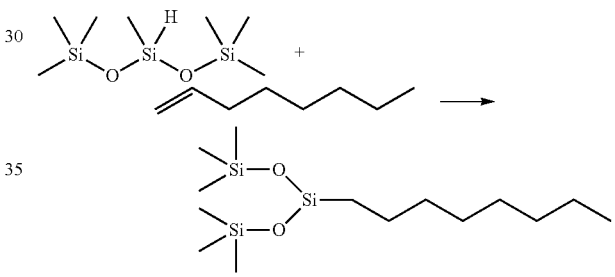

Example 33

A reactor was charged with 435 mg (0.5 mmol) of Cobalt carboxylate A obtained in Synthesis Example 3, 545 mg (1.5 mmol) of Isocyanide L-1 obtained in Example 1 as isocyanide ligand, 14.43 g (65 mmol) of 1,1,1,3,5,5,5-heptamethyltrisiloxane as hydrosiloxane, and 5.60 g (50 mmol) of 1-octene, which were stirred at 80° C. for 3 hours. Analysis was made by gas chromatography, from which yield determined by GC (GC yield) was computed according to the following calculation formula.

$$GC\ yield\ (\%) = \frac{peak\ area\ of\ target\ compound}{(overall\ peak\ area) - (peak\ area\ of\ unreacted\ hydrosiloxane)} \times 100 \quad [\text{Math. 1}]$$

As a result, the GC yield was 91%. It was confirmed that on ¹H-NMR and gas chromatography analyses, the retention time of the target compound as isolated by distillation was identical with that of the product separately synthesized using a platinum catalyst. (Notably, in the subsequent Examples, the determination of GC yield by gas chromatography is similarly performed in this procedure.)

Example 34

A reactor was charged with 217 mg (0.25 mmol) of Cobalt carboxylate A obtained in Synthesis Example 3, 545 mg (1.5 mmol) of Isocyanide L-1 obtained in Example 1 as isocyanide ligand, 14.43 g (65 mmol) of 1,1,1,3,5,5,5-heptamethyltrisiloxane as hydrosiloxane, and 5.60 g (50 mmol) of 1-octene, which were stirred at 80° C. for 7.5 hours. The GC yield was 95% as analyzed by gas chromatography.

Example 35

A reactor was charged with 312 mg (0.25 mmol) of Cobalt carboxylate C obtained in Synthesis Example 5, 545 mg (1.5 mmol) of Isocyanide L-1 obtained in Example 1 as isocyanide ligand, 14.43 g (65 mmol) of 1,1,1,3,5,5,5-heptamethyltrisiloxane as hydrosiloxane, and 5.60 g (50 mmol) of 1-octene, which were stirred at 80° C. for 7 hours. The GC yield was 94% as analyzed by gas chromatography.

Example 36

A reactor was charged with 125 mg (0.10 mmol) of Cobalt carboxylate C obtained in Synthesis Example 5, 436 mg (1.2 mmol) of Isocyanide L-1 obtained in Example 1 as isocyanide ligand, 14.43 g (65 mmol) of 1,1,1,3,5,5,5-heptamethyltrisiloxane as hydrosiloxane, and 5.60 g (50 mmol) of 1-octene, which were stirred at 80° C. for 10 hours. The GC yield was 77% as analyzed by gas chromatography.

Example 37

A reactor was charged with 65 mg (0.25 mmol) of cobalt pivalate obtained in Synthesis Example 2, 545 mg (1.5 mmol) of Isocyanide L-1 obtained in Example 1 as isocyanide ligand, 14.43 g (65 mmol) of 1,1,1,3,5,5,5-heptamethyltrisiloxane as hydrosiloxane, and 5.60 g (50 mmol) of 1-octene, which were stirred at 80° C. for 4.5 hours. The GC yield was 91% as analyzed by gas chromatography.

Example 38

A reactor was charged with 44 mg (0.25 mmol) of commercially available cobalt acetate (Co(OAc)$_2$), 545 mg (1.5 mmol) of Isocyanide L-1 obtained in Example 1 as isocyanide ligand, 14.43 g (65 mmol) of 1,1,1,3,5,5,5-heptamethyltrisiloxane as hydrosiloxane, and 5.60 g (50 mmol) of 1-octene, which were stirred at 80° C. for 6 hours. The GC yield was 82% as analyzed by gas chromatography.

Comparative Example 3

A reactor was charged with 2 mg (0.01 mmol) of commercially available cobalt acetate (Co(OAc)$_2$), 10 mg (0.06 mmol) of 1-isocyanoadamantane, 777 mg (3.5 mmol) of 1,1,1,3,5,5,5-heptamethyltrisiloxane as hydrosiloxane, and 224 mg (2 mmol) of 1-octene, which were stirred at 80° C. for 6 hours. After cooling, the product was analyzed by $^1$H-NMR spectroscopy to determine its yield. As a result, the yield was 0%.

Example 39

A reactor was charged with 62 mg (0.25 mmol) of commercially available cobalt acetate tetrahydrate (Co(OAc)$_2$.4H$_2$O), 545 mg (1.5 mmol) of Isocyanide L-1 obtained in Example 1 as isocyanide ligand, 14.43 g (65 mmol) of 1,1,1,3,5,5,5-heptamethyltrisiloxane as hydrosiloxane, and 5.60 g (50 mmol) of 1-octene, which were stirred at 80° C. for 7 hours. The GC yield was 42% as analyzed by gas chromatography.

Example 40

A reactor was charged with 217 mg (0.25 mmol) of Cobalt carboxylate A obtained in Synthesis Example 3, 718 mg (1.5 mmol) of Isocyanide L-2 obtained in Example 2 as isocyanide ligand, 14.43 g (65 mmol) of 1,1,1,3,5,5,5-heptamethyltrisiloxane as hydrosiloxane, and 5.60 g (50 mmol) of 1-octene, which were stirred at 80° C. for 3.5 hours. The GC yield was 68% as analyzed by gas chromatography.

Example 41

A reactor was charged with 217 mg (0.25 mmol) of Cobalt carboxylate A obtained in Synthesis Example 3, 201 mg (0.75 mmol) of Isocyanide L-3 obtained in Example 3 as isocyanide ligand, 14.43 g (65 mmol) of 1,1,1,3,5,5,5-heptamethyltrisiloxane as hydrosiloxane, and 5.60 g (50 mmol) of 1-octene, which were stirred at 80° C. for 6.5 hours. The GC yield was 34% as analyzed by gas chromatography.

Example 42

A reactor was charged with 217 mg (0.25 mmol) of Cobalt carboxylate A obtained in Synthesis Example 3, 121 mg (0.75 mmol) of 1-isocyanoadamantane, 272 mg (0.75 mmol) of Isocyanide L-1 obtained in Example 1 as isocyanide ligand, 14.43 g (65 mmol) of 1,1,1,3,5,5,5-heptamethyltrisiloxane as hydrosiloxane, 5.60 g (50 mmol) of 1-octene, and 3 mL of toluene, which were stirred at 80° C. for 8.5 hours. The GC yield was 85% as analyzed by gas chromatography.

(6) Reaction of heptamethyltrisiloxane with 2-octene

[Chem. 9]

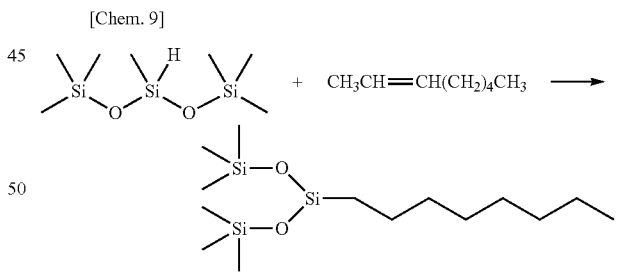

Example 43

A reactor was charged with 217 mg (0.25 mmol) of Cobalt carboxylate A obtained in Synthesis Example 3, 545 mg (1.5 mmol) of Isocyanide L-1 obtained in Example 1 as isocyanide ligand, 14.43 g (65 mmol) of 1,1,1,3,5,5,5-heptamethyltrisiloxane as hydrosiloxane, and 5.60 g (50 mmol) of 2-octene, which were stirred at 80° C. for 7 hours. Only the same product as the addition compound with 1-octene was obtained. The GC yield was 77% as analyzed by gas chromatography.

(7) Reaction of Heptamethyltrisiloxane with 3-Octene

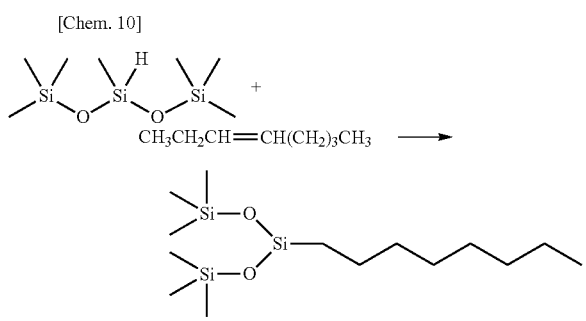

Example 44

A reactor was charged with 217 mg (0.25 mmol) of Cobalt carboxylate A obtained in Synthesis Example 3, 545 mg (1.5 mmol) of Isocyanide L-1 obtained in Example 1 as isocyanide ligand, 14.43 g (65 mmol) of 1,1,1,3,5,5,5-heptamethyltrisiloxane as hydrosiloxane, and 5.60 g (50 mmol) of 3-octene, which were stirred at 80° C. for 7 hours. Only the same product as the addition compound with 1-octene was obtained. The GC yield was 38% as analyzed by gas chromatography.

(8) Reaction of Pentamethyldisiloxane with 1-Octene

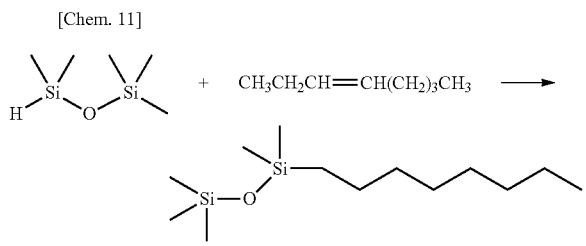

Example 45

A reactor was charged with 12 mg (0.01 mmol) of iridium acetate (Alfa Aesar), 22 mg (0.06 mmol) of Isocyanide L-1 obtained in Example 1 as isocyanide ligand, 254 μL (1.3 mmol) of 1,1,1,3,3-pentamethyldisiloxane as hydrosiloxane, and 157 μL (1.0 mmol) of 1-octene, which were stirred at 80° C. for 24 hours. After cooling, the product was analyzed by $^1$H-NMR spectroscopy to determine its yield. As a result, the yield of the hydrosilylated product was 50%.

Example 46

A reactor was charged with 6 mg (0.03 mmol) of commercially available zinc acetate, 22 mg (0.06 mmol) of Isocyanide L-1 obtained in Example 1 as isocyanide ligand, 254 μL (1.3 mmol) of 1,1,1,3,3-pentamethyldisiloxane as hydrosiloxane, and 157 μL (1.0 mmol) of 1-octene, which were stirred at 80° C. for 24 hours. After cooling, the product was analyzed by $^1$H-NMR spectroscopy to determine its yield. As a result, the yield of the hydrosilylated product was 4%.

Example 47

A reactor was charged with 5 mg (0.03 mmol) of commercially available silver acetate, 22 mg (0.06 mmol) of Isocyanide L-1 obtained in Example 1 as isocyanide ligand, 254 μL (1.3 mmol) of 1,1,1,3,3-pentamethyldisiloxane as hydrosiloxane, and 157 μL (1.0 mmol) of 1-octene, which were stirred at 80° C. for 24 hours. After cooling, the product was analyzed by $^1$H-NMR spectroscopy to determine its yield. As a result, the yield of the hydrosilylated product was 5%.

[Synthesis Example 8] Synthesis of Cobalt Carboxylate D

A 20 mL recovery flask was charged with 0.50 g (2.87 mmol) of cobalt acetate and 1.47 g (5.74 mmol) of palmitic acid, which were stirred at 170° C. for 1 hour. Thereafter, the product was vacuum dried at the temperature for 1 hour, obtaining Cobalt carboxylate D (1.50 g).
FT-IR (KBr) ν: 2915, 2849, 1543, 1467, 1410, 1317, 720 cm$^{-1}$
FT-IR (KBr) ν: 2915, 2849, 1543, 1467, 141, 1317, 720 cm$^{-1}$

[Synthesis Example 9] Synthesis of Cobalt Carboxylate E

A 20 mL recovery flask was charged with 0.50 g (2.84 mmol) of cobalt acetate and 1.46 g (5.70 mmol) of isopalmitic acid, which were stirred at 170° C. for 1 hour. Thereafter, the product was vacuum dried at the temperature for 1 hour, obtaining Cobalt carboxylate E (1.50 g).
FT-IR (KBr) ν: 2954, 1922, 2853, 1603, 1577, 1457, 1417, 1260, 1276, 765 cm$^{-1}$

[Synthesis Example 10] Synthesis of Cobalt Carboxylate F

A 20 mL recovery flask was charged with 0.51 g (2.89 mmol) of cobalt acetate and 1.62 g (5.71 mmol) of isostearic acid (isomer mixture, Nissan Chemical Industries Ltd.), which were stirred at 170° C. for 1 hour. Thereafter, the product was vacuum dried at the temperature for 1 hour, obtaining Cobalt carboxylate F (1.50 g).
FT-IR (KBr) ν: 2952, 2867, 1618, 1576, 1457, 1424, 1363, 1276, 765 cm$^{-1}$

[Synthesis Example 11] Synthesis of Cobalt 2-Ethylhexanoate

A 20 mL recovery flask was charged with 1.00 g (5.65 mmol) of cobalt acetate and 1.63 g (11.3 mmol) of 2-ethylhexanoic acid, which were stirred at 170° C. for 2 hours. The reaction product was vacuum dried at the temperature for 1 hour, then vacuum dried at 190° C. for 2 hours, obtaining cobalt 2-ethylhexanoate. The amount was 1.93 g.

[Synthesis Example 12] Synthesis of Cobalt Octanoate

A 20 mL recovery flask was charged with 1.00 g (5.65 mmol) of cobalt acetate and 1.63 g (11.3 mmol) of octanoic acid, which were stirred at 170° C. for 2 hours. The reaction product was vacuum dried at the temperature for 1 hour, then vacuum dried at 190° C. for 2 hours, obtaining cobalt octanoate. The amount was 1.93 g.

[Synthesis Example 13] Synthesis of Cobalt Laurate

A 20 mL recovery flask was charged with 1.00 g (5.65 mmol) of cobalt acetate and 2.26 g (11.3 mmol) of lauric acid, which were stirred at 170° C. for 2 hours. The reaction product was vacuum dried at the temperature for 1 hour, then vacuum dried at 190° C. for 2 hours, obtaining cobalt laurate. The amount was 2.57 g.

[Synthesis Example 14] Synthesis of Iron Carboxylate A

A 50 mL two-necked round-bottomed flask was charged with 1.08 g (44.3 mmol) of magnesium ribbon and 35 mL of THF, to which 49 g (42.6 mmol) of 8-bromomesitylene was slowly added dropwise. It was observed that an exotherm ceased after some time from the end of dropwise addition, after which the solution was stirred at 60° C. for 3 hours. The resulting solution was filtered through a glass filter, obtaining a THF solution of mesitylmagnesium bromide Grignard reagent.

A 100 mL Schlenk flask was charged with 2.63 g (20.7 mmol) of $FeCl_2$, 30 mL of THF, and 10 mL of 1,4-dioxane and cooled down to −78° C. The THF solution of mesitylmagnesium bromide Grignard reagent was slowly added to the flask, followed by stirring at 25° C. for 2 hours. On this occasion, the reaction solution turned from a brown suspension to a red suspension. Thereafter, the precipitated solid was separated by centrifugation and dried in vacuum. The resulting red solid was dissolved in diethyl ether, after which the solid was separated again by centrifugation and recrystallized at −30° C., obtaining a crystal (amount 4.36 g, yield 72%).

Next, 0.20 g (0.34 mmol) of the thus obtained [(Fe(mesityl)(μ-mesityl)]$_2$ was placed in a vial and dissolved in 10 mL of $Et_2O$. With stirring, 0.56 g (1.37 mmol) of $(Me_3SiO)_2MeSi(CH_2)_{10}COOH$ was slowly added dropwise. This was followed by distillation under reduced pressure, obtaining brown Iron carboxylate A (0.72 g).

FT-IR (KBr) ν: 2958, 2923, 2854, 1524, 1441, 1257, 1050, 843, 783, 754 cm$^{-1}$

[Synthesis Example 15] Synthesis of Iron Carboxylate B

A vial was charged with 0.20 g (0.34 mmol) of [(Fe(mesityl)(μ-mesityl)]$_2$ in Synthesis Example 14, which was dissolved in 10 mL of $Et_2O$. With stirring, 0.42 g (1.37 mmol) of $(Me_3SiO)_2MeSi(CH_2)_3COOH$ was slowly added dropwise. This was followed by distillation under reduced pressure, obtaining brown Iron carboxylate B (0.60 g).

FT-IR (KBr) ν: 2957, 1609, 1576, 1542, 1457, 1406, 1257, 1038, 835, 795, 780, 751 cm$^{-1}$

[Synthesis Example 16] Synthesis of Iron Carboxylate C

A vial was charged with 0.20 g (0.34 mmol) of [(Fe(mesityl)(p-mesityl)]$_2$ in Synthesis Example 14, which was dissolved in 10 mL of $Et_2O$. With stirring, 0.35 g (1.37 mmol) of isopalmitic acid was slowly added dropwise. This was followed by distillation under reduced pressure, obtaining brown Iron carboxylate C (0.52 g).

FT-IR (KBr) ν: 2954, 2922, 2853, 1560, 1523, 1456, 1418, 1276, 1260, 764, 723 cm$^{-1}$

[Synthesis Example 17] Synthesis of Iron 2-Ethylhexanoate

A 100 ml three-neck flask equipped with a distilling trap was charged with 1.02 g (5.86 mmol) of iron acetate, 3.68 g (25.52 mmol) of 2-ethylhexanoic acid, and 15.8 g of xylene. Reaction was conducted at 170° C. for 1 hour while the solvent was distilled off via the distilling trap. This was followed by vacuum drying, obtaining deep green iron 2-ethylhexanoate (1.87 g).

[Example 48] Synthesis of Isocyanide L-4

A 100 mL flask was charged with 9.15 g (0.090 mol) of acetic anhydride and cooled to an internal temperature of −10° C. To the flask, 8.23 g (0.179 mol) of formic acid was added dropwise. The contents were stirred for 30 minutes with the flask kept cool, further stirred for 3 hours at an internal temperature of 40° C., and cooled to room temperature.

A 100 mL flask was charged with 21.0 g (0.075 mol) of $(Me_3SiO)_2Si(Me)CH_2CH_2CH_2NH_2$ and 35 mL of tetrahydrofuran and cooled to an internal temperature of −20° C. The reaction solution prepared above was added dropwise to the flask at such a rate that the internal temperature might not exceed −5° C. After the completion of dropwise addition, stirring was continued at −15° C. for a further 2 hours. Then the volatile was evaporated, obtaining 22.75 g of a N-formylated crude product.

A 100 mL flask was charged with 22.75 g (0.074 mol) of the N-formylated product, 90.0 g of methylene chloride, and 22.77 g (0.225 mol) of diisopropylamine, and cooled to an internal temperature of 5° C. To the flask, 15.00 g (0.098 mol) of phosphoryl chloride was added dropwise. The contents were stirred for 2 hours with the flask kept cool. Then 120.0 g of 20 wt % sodium carbonate aqueous solution was added dropwise. After the completion of dropwise addition, the solution was stirred at 5° C. for 1 hour. The resulting salt was filtered off and the water layer was separated. The organic layer was washed with water 3 times, dried over sodium sulfate, filtered, and distilled, obtaining the target compound: $(Me_2SiO)_2Si(Me)CH_2CH_2CH_2NC$. Amount 12.25 g, yield 55.9%.

[Example 49] Synthesis of Isocyanide L-5

A 100 mL flask was charged with 13.54 g (0.133 mol) of acetic anhydride and cooled to an internal temperature of −10° C. To the flask, 12.26 g (0.266 mol) of formic acid was added dropwise. The contents were stirred for 30 minutes with the flask kept cool, further stirred for 3 hours at an internal temperature of 40° C., and cooled to room temperature.

A 200 mL flask was charged with 63.29 g (0.110 mol) of $[(Me_3SiO)_2Si(Me)O]_2Si(Me)CH_2CH_2CH_2NH_2$ and 100.0 g of tetrahydrofuran and cooled to an internal temperature of −20° C. The reaction solution prepared above was added dropwise to the flask at such a rate that the internal temperature might not exceed −5° C. After the completion of dropwise addition, stirring was continued at −15° C. for a further 2 hours. Then the volatile was evaporated, obtaining 56.36 g of a N-formylated crude product.

A 100 mL flask was charged with 55.46 g of the N-formylated product, 151.6 g of methylene chloride, and 34.25 g (0.339 mol) of diisopropylamine, and cooled to an internal temperature of 5° C. To the flask, 19.84 g (0.130 mol) of phosphoryl chloride was added dropwise. The contents were stirred for 2 hours with the flask kept cool. Then 175.0 g of 20 wt % sodium carbonate aqueous solution was added dropwise. After the completion of dropwise addition, the solution was stirred at 5° C. for 1 hour. The resulting salt was filtered off and the water layer was separated. The organic layer was washed with water 3 times, dried over sodium sulfate, filtered, and distilled, obtaining the target compound: [(Me$_3$SiO)$_2$Si(Me)O]$_2$Si(Me)CH$_2$CH$_2$CH$_2$NC. Amount 36.75 g, yield 57.8%, b.p. 115° C./0.3 kPa.

[Example 50] Synthesis of Isocyanide L-6

A 300 mL flask was charged with 60.9 g (0.60 mol) of acetic anhydride and cooled to an internal temperature of 5° C. To the flask, 55.0 g (1.20 mol) of formic acid was added dropwise. The contents were stirred for 30 minutes with the flask kept cool, further stirred for 2 hours at an internal temperature of 40° C., and cooled to room temperature.

A 500 mL flask was charged with 135.6 g (0.32 mol) of 1,3,5,7-tetramethyl-3,5,7-tripropyl-3-aminopropylcyclotetrasiloxane and 200 mL of tetrahydrofuran and cooled to an internal temperature of −20° C. The reaction solution prepared above was added dropwise to the flask at such a rate that the internal temperature might not exceed −5° C. After the completion of dropwise addition, stirring was continued at −15° C. for a further 2 hours. Then the volatile was evaporated, obtaining 145.7 g of a N-formylated crude product.

A 2 L flask was charged with 145.7 g of the N-formylated product, 200 mL of methylene chloride, and 113.1 g (1.12 mol) of diisopropylamine, and cooled to an internal temperature of 5° C. To the flask, 54.0 g (0.35 mol) of phosphoryl chloride was added dropwise. The contents were stirred for 2 hours with the flask kept cool. Then 802.0 g of 20 wt % sodium carbonate aqueous solution was added dropwise. After the completion of dropwise addition, the solution was stirred at room temperature for 15 hours. The resulting salt was filtered off and the water layer was separated. The organic layer was washed with water 3 times, dried over sodium sulfate, filtered, and distilled, obtaining 1,3,5,7-tetramethyl-3,5,7-tripropyl-3-isocyanidopropylcyclotetrasiloxane. Amount 92.8 g, yield 67.0%, b.p. 132.0-133.5° C./0.3 kPa. Purity 99.4% as analyzed by gas chromatography.

[Chem. 12]

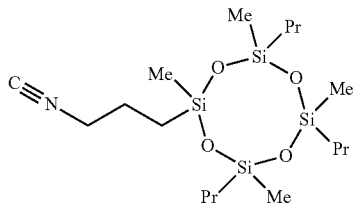

[Example 51] Synthesis of Isocyanide L-7

A 1 L flask was charged with 24.5 g (60 wt % liquid paraffin dispersion, 0.61 mol) of sodium hydride, 400 mL of dimethylformamide, and 24.4 g (0.54 mol) of formamide and heated at an internal temperature of 120° C. Stirring was continued for 2 hours. With the internal temperature lowered to 100° C., 120.9 g (0.51 mol) of tBu(Me)$_2$SiOSi(Me)$_2$CH$_2$Cl was added dropwise. After the completion of dropwise addition, the internal temperature was raised to 120° C., followed by stirring for a further 5 hours. This was followed by cooling to room temperature, salt filtration, water washing, and removal of the solvent and unreacted reactants under reduced pressure, obtaining 29.0 g of tBu(Me)$_2$SiOSi(Me)$_2$CH$_2$NHCHO crude product.

A 500 mL flask was charged with 29.0 g (0.117 mol) of the tBu(Me)$_2$SiOSi(Me)$_2$CH$_2$NHCHO crude product, 60 mL of methylene chloride, and 41.4 g (0.410 mol) of diisopropylamine, and cooled to an internal temperature of 5° C. To the flask, 19.8 g (0.129 mol) of phosphoryl chloride was added dropwise. The contents were stirred for 2 hours with the flask kept cool. Then 293.3 g of 20 wt % sodium carbonate aqueous solution was added dropwise. After the completion of dropwise addition, the solution was stirred at room temperature for 15 hours. The resulting salt was filtered off and the water layer was separated. The organic layer was washed with water 3 times, dried over sodium sulfate, filtered, and distilled, obtaining the target compound: tBu(Me)$_2$SiOSi(Me)$_2$CH$_2$NC. Amount 7.66 g, yield 28.6%, b.p. 88.0-91.0° C./0.9 kPa. Purity 84.0% as analyzed by gas chromatography.

[Example 52] Synthesis of Isocyanide L-8

A 1 L flask was charged with 51.0 g (60 wt % liquid paraffin dispersion, 1.275 mol) of sodium hydride, 600 mL of dimethylformamide, and 49.5 g (1.10 mol) of formamide and heated at an internal temperature of 120° C. Stirring was continued for 2 hours. With the internal temperature lowered to 60° C., 143.2 g (1.06 mol) of CH$_2$=CH(Me)$_2$SiCH$_2$Cl was added dropwise. After the completion of dropwise addition, the internal temperature was raised to 120° C., followed by stirring for a further 5 hours. This was followed by cooling to room temperature, salt filtration, water washing, and removal of the solvent and unreacted reactants under reduced pressure, obtaining 60.3 g of CH$_2$=CH(Me)$_2$SiCH$_2$NHCHO crude product.

A 500 mL flask was charged with 60.3 g (0.42 mol) of CH$_2$=CH(Me)$_2$SiCH$_2$NHCHO and heated at an internal temperature of 80° C., after which 112.3 g (0.51 mol) of 1,1,1,3,5,5,5-heptamethyltrisiloxane and 3.0 g of a 3 wt % ethanol solution of chloroplatinic acid were added dropwise. After the completion of dropwise addition, the internal temperature was raised to 100° C. and stirring was continued for 5 hours. The unreacted reactants were removed under reduced pressure, obtaining 61.8 g of (Me$_3$SiO)$_2$Si(Me)CH$_2$CH$_2$Si(Me)$_2$CH$_2$NHCHO crude product.

A 500 mL flask was charged with 45.7 g (0.125 mol) of the (Me$_3$SiO)$_2$Si(Me)CH$_2$CH$_2$Si(Me)$_2$CH$_2$NHCHO crude product, 50 mL of methylene chloride, and 44.2 g (0.438 mol) of diisopropylamine, and cooled to an internal temperature of 5° C. To the flask, 21.1 g (0.137 mol) of phosphoryl chloride was added dropwise. The contents were stirred for 2 hours with the flask kept cool. Then 376 g of 20 wt % sodium carbonate aqueous solution was added dropwise. After the completion of dropwise addition, the solution was stirred at room temperature for 15 hours. The resulting salt was filtered off and the water layer was separated. The organic layer was washed with water 3 times, dried over sodium sulfate, filtered, and distilled, obtaining the target compound: (Me$_3$SiO)$_2$Si(Me)CH$_2$CH$_2$Si(Me)$_2$CH$_2$NC.

Amount 12.0 g, yield 27.6%, b.p. 97.0-99.0° C./0.3 kPa. Purity 96.5% as analyzed by gas chromatography.

[Example 53] Synthesis of Isocyanide L-9

A 500 mL flask was charged with 123.1 g (1.21 mol) of acetic anhydride and cooled to an internal temperature of 5° C. To the flask, 111.0 g (2.41 mol) of formic acid was added dropwise. The contents were stirred for 30 minutes with the flask kept cool, further stirred for 2 hours at an internal temperature of 40° C., and cooled to room temperature.

A 1 L flask was charged with 212.4 g (0.65 mol) of 1,1,3-trimethyl-3,3-diphenyl-3-aminopropyldisiloxane and 250 mL of tetrahydrofuran and cooled to an internal temperature of −20° C. The reaction solution prepared above was added dropwise to the flask at such a rate that the internal temperature might not exceed −5° C. After the completion of dropwise addition, stirring was continued at −15° C. for a further 2 hours. Then the volatile was evaporated, obtaining 230.0 g of a N-formylated crude product.

A 3 L flask was charged with 230.0 g of the N-formylated product, 230 mL of methylene chloride, and 228.1 g (2.26 mol) of diisopropylamine, and cooled to an internal temperature of 5° C. To the flask, 108.9 g (0.71 mol) of phosphoryl chloride was added dropwise. The contents were stirred for 2 hours with the flask kept cool. Then 1620 g of 20 wt % sodium carbonate aqueous solution was added dropwise. After the completion of dropwise addition, the solution was stirred at room temperature for 15 hours. The resulting salt was filtered off and the water layer was separated. The organic layer was washed with water 3 times, dried over sodium sulfate, filtered, and distilled, obtaining Me(Ph)$_2$SiOSi(Me)$_2$CH$_2$CH$_2$CH$_2$NC. Amount 118.7 g, yield 53.9%, b.p. 166.0-169.0° C./0.2 kPa. Purity 99.0% as analyzed by gas chromatography.

[Chem. 13]

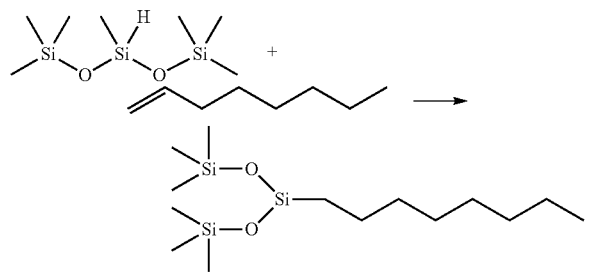

Example 54

A reactor was charged with 5.7 mg (0.01 mmol) of Cobalt carboxylate D obtained in Synthesis Example 8, 10.9 mg (0.03 mmol) of Isocyanide L-1 obtained in Example 1 as isocyanide ligand, 223 mg (1.0 mmol) of 1,1,1,3,5,5,5-heptamethyltrisiloxane as hydrosiloxane, and 146 mg (1.3 mmol) of 1-octene, which were stirred at 80° C. for 3 hours. After cooling, the product was analyzed by $^1$H-NMR spectroscopy to determine its yield. As a result, the yield was 65%.

Example 55

A reactor was charged with 142.3 mg (0.25 mmol) of Cobalt carboxylate E obtained in Synthesis Example 9, 544.5 mg (1.50 mmol) of Isocyanide L-1 obtained in Example 1 as isocyanide ligand, 14.43 g (65.0 mmol) of 1,1,1,3,5,5,5-heptamethyltrisiloxane as hydrosiloxane, and 5.60 g (50.0 mmol) of 1-octene, which were stirred at 80° C. for 6 hours. The GC yield was 90.6% as analyzed by gas chromatography.

Example 56

A reactor was charged with 149.3 mg (0.25 mmol) of Cobalt carboxylate F obtained in Synthesis Example 10, 544.5 mg (1.50 mmol) of Isocyanide L-1 obtained in Example 1 as isocyanide ligand, 14.43 g (65.0 mmol) of 1,1,1,3,5,5,5-heptamethyltrisiloxane as hydrosiloxane, and 5.60 g (50.0 mmol) of 1-octene, which were stirred at 80° C. for 4 hours. The GC yield was 88.7% as analyzed by gas chromatography.

Example 57

A reactor was charged with 86.3 mg (0.25 mmol) of cobalt 2-ethylhexanoate obtained in Synthesis Example 11, 544.5 mg (1.50 mmol) of Isocyanide L-1 obtained in Example 1 as isocyanide ligand, 14.43 g (65.0 mmol) of 1,1,1,3,5,5,5-heptamethyltrisiloxane as hydrosiloxane, and 5.60 g (50.0 mmol) of 1-octene, which were stirred at 80° C. for 6 hours. The GC yield was 92.0% as analyzed by gas chromatography.

Example 58

A reactor was charged with 86.3 mg (0.25 mmol) of cobalt octanoate obtained in Synthesis Example 12, 544.5 mg (1.50 mmol) of Isocyanide L-1 obtained in Example 1 as isocyanide ligand, 14.43 g (65.0 mmol) of 1,1,1,3,5,5,5-heptamethyltrisiloxane as hydrosiloxane, and 5.60 g (50.0 mmol) of 1-octene, which were stirred at 80° C. for 4.5 hours. The GC yield was 91.3% as analyzed by gas chromatography.

Example 59

A reactor was charged with 114.3 mg (0.25 mmol) of cobalt laurate obtained in Synthesis Example 13, 544.5 mg (1.50 mmol) of Isocyanide L-1 obtained in Example 1 as isocyanide ligand, 14.43 g (65.0 mmol) of 1,1,1,3,5,5,5-heptamethyltrisiloxane as hydrosiloxane, and 5.60 g (50.0 mmol) of 1-octene, which were stirred at 80° C. for 4.5 hours. The GC yield was 87.8% as analyzed by gas chromatography.

Example 60

A reactor was charged with 57 mg (0.10 mmol) of Cobalt carboxylate E obtained in Synthesis Example 9, 173 mg (0.60 mmol) of Isocyanide L-4 obtained in Example 48 as isocyanide ligand, 5.76 g (26 mmol) of 1,1,1,3,5,5,5-heptamethyltrisiloxane as hydrosiloxane, and 2.24 g (20 mmol) of 1-octene, which were stirred at 80° C. for 4 hours. After cooling, the product was analyzed by $^1$H-NMR spectroscopy to determine its yield. As a result, the yield was 54%.

Example 61

A reactor was charged with 57 mg (0.10 mmol) of Cobalt carboxylate E obtained in Synthesis Example 9, 357 mg (0.61 mmol) of Isocyanide L-5 obtained in Example 49 as isocyanide ligand, 5.77 g (26 mmol) of 1,1,1,3,5,5,5-heptamethyltrisiloxane as hydrosiloxane, and 2.24 g (20 mmol) of 1-octene, which were stirred at 80° C. for 4 hours. After cooling, the product was analyzed by $^1$H-NMR spectroscopy to determine its yield. As a result, the yield was 66%.

Example 62

A reactor was charged with 142.3 mg (0.25 mmol) of Cobalt carboxylate E obtained in Synthesis Example 9, 649.5 mg (1.50 mmol) of Isocyanide L-6 obtained in Example 50 as isocyanide ligand, 14.43 g (65.0 mmol) of 1,1,1,3,5,5,5-heptamethyltrisiloxane as hydrosiloxane, and 5.60 g (50.0 mmol) of 1-octene, which were stirred at 80° C. for 4 hours. The GC yield was 82.0% as analyzed by gas chromatography.

Example 63

A reactor was charged with 142.3 mg (0.25 mmol) of Cobalt carboxylate E obtained in Synthesis Example 9, 343.5 mg (1.50 mmol) of Isocyanide L-7 obtained in Example 51 as isocyanide ligand, 14.43 g (65.0 mmol) of 1,1,1,3,5,5,5-heptamethyltrisiloxane as hydrosiloxane, and 5.60 g (50.0 mmol) of 1-octene, which were stirred at 80° C. for 8 hours. The GC yield was 35.5% as analyzed by gas chromatography.

Example 64

A reactor was charged with 142.3 mg (0.25 mmol) of Cobalt carboxylate E obtained in Synthesis Example 9, 520.5 mg (1.50 mmol) of Isocyanide L-8 obtained in Example 52 as isocyanide ligand, 14.43 g (65.0 mmol) of 1,1,1,3,5,5,5-heptamethyltrisiloxane as hydrosiloxane, and 5.60 g (50.0 mmol) of 1-octene, which were stirred at 80° C. for 4 hours. The GC yield was 64.8% as analyzed by gas chromatography.

Example 65

A reactor was charged with 142.3 mg (0.25 mmol) of Cobalt carboxylate E obtained in Synthesis Example 9, 508.5 mg (1.50 mmol) of Isocyanide L-9 obtained in Example 53 as isocyanide ligand, 14.43 g (65.0 mmol) of 1,1,1,3,5,5,5-heptamethyltrisiloxane as hydrosiloxane, and 5.60 g (50.0 mmol) of 1-octene, which were stirred at 80° C. for 8 hours. The GC yield was 50.9% as analyzed by gas chromatography.

(9) Reaction of Various Hydrosilanes with α-Methylstyrene

[Chem. 14]

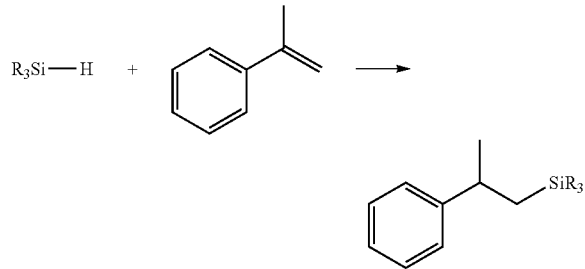

Example 66

A reactor was charged with 1.8 mg (0.01 mmol) of cobalt diisopropoxide (Aldrich), 10.9 mg (0.03 mmol) of Isocyanide L-1 obtained in Example 1 as isocyanide ligand, 192 mg (1.3 mmol) of 1,1,3,3,3-pentamethyldisiloxane as hydrosiloxane, and 118 mg (1.0 mmol) of α-methylstyrene, which were stirred at 80° C. for 24 hours. After cooling, the product was analyzed by $^1$H-NMR spectroscopy to determine its yield. As a result, the yield was 97%.

Example 67

A reactor was charged with 7.8 mg (0.03 mmol) of cobalt pivalate obtained in Synthesis Example 2, 32.7 mg (0.09 mmol) of Isocyanide L-1 obtained in Example 1 as isocyanide ligand, 214 mg (1.3 mmol) of triethoxysilane as hydrosiloxane, and 118 mg (1 mmol) of α-methylstyrene, which were stirred at 80° C. for 3 hours. After cooling, the product was analyzed by $^1$H-NMR spectroscopy to determine its yield. As a result, the yield was 33%.

Example 68

A reactor was charged with 2.6 mg (0.01 mmol) of cobalt pivalate obtained in Synthesis Example 2, 10.9 mg (0.03 mmol) of Isocyanide L-1 obtained in Example 1 as isocyanide ligand, 1.07 g (0.5 mmol) of both end hydrodimethylsilyl-capped polydimethylsiloxane (average DOP 27) as hydrosiloxane, and 153 mg (1.3 mmol) of α-methylstyrene, which were stirred at 80° C. for 6 hours. After cooling, the product was analyzed by $^1$H-NMR spectroscopy to determine its yield. As a result, the yield was 82%.

Example 69

A reactor was charged with 8.9 mg (0.01 mmol) of Cobalt carboxylate A obtained in Synthesis Example 3, 10.9 mg (0.03 mmol) of Isocyanide L-1 obtained in Example 1 as isocyanide ligand, 1.07 g (0.5 mmol) of both end hydrodimethylsilyl-capped polydimethylsiloxane (average DOP 27) as hydrosiloxane, and 153 mg (1.3 mmol) of α-methylstyrene, which were stirred at 80° C. for 3 hours. After cooling, the product was analyzed by $^1$H-NMR spectroscopy to determine its yield. As a result, the yield was 46%.

Example 70

A reactor was charged with 5.7 mg (0.01 mmol) of Cobalt carboxylate E obtained in Synthesis Example 9, 10.9 mg (0.03 mmol) of Isocyanide L-1 obtained in Example 1 as isocyanide ligand, 1.07 g (0.5 mmol) of both end hydrodimethylsilyl-capped polydimethylsiloxane (average DOP 27) as hydrosiloxane, and 153 mg (1.3 mmol) of α-methylstyrene, which were stirred at 80° C. for 3 hours. After cooling, the product was analyzed by $^1$H-NMR spectroscopy to determine its yield. As a result, the yield was 62%.

(10) Reaction of Both End Trimethylsilyl-Capped Poly (Dimethylsiloxane-Methylhydrosiloxane) Copolymer with Alkene

[Chem. 15]

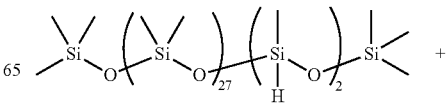

-continued

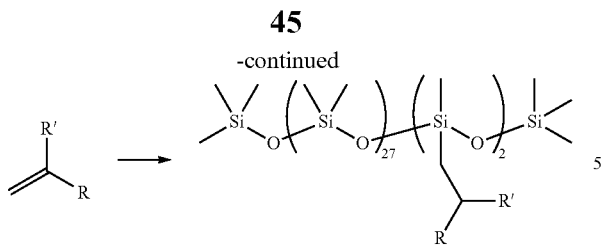

Example 71

A reactor was charged with 8.7 mg (0.01 mmol) of Cobalt carboxylate A obtained in Synthesis Example 3, 10.9 mg (0.03 mmol) of Isocyanide L-1 obtained in Example 1 as isocyanide ligand, 1.14 g (0.5 mmol) of both end trimethylsilyl-capped poly(dimethylsiloxane-methylhydrosiloxane) copolymer as hydrosiloxane, and 153 mg (1.3 mmol) of α-methylstyrene, which were stirred at 80° C. for 24 hours. After cooling, the product was analyzed by $^1$H-NMR spectroscopy to determine its yield. As a result, the yield was 57%.

Example 72

A reactor was charged with 5.7 mg (0.01 mmol) of Cobalt carboxylate E obtained in Synthesis Example 9, 10.9 mg (0.03 mmol) of Isocyanide L-1 obtained in Example 1 as isocyanide ligand, 1.14 g (0.5 mmol) of both end trimethylsilyl-capped poly(dimethylsiloxane-methylhydrosiloxane) copolymer as hydrosiloxane, and 153 mg (1.3 mmol) of α-methylstyrene, which were stirred at 80° C. for 24 hours. After cooling, the product was analyzed by $^1$H-NMR spectroscopy to determine its yield. As a result, the yield was 53%.

Example 73

A reactor was charged with 8.7 mg (0.01 mmol) of Cobalt carboxylate A obtained in Synthesis Example 3, 10.9 mg (0.03 mmol) of Isocyanide L-1 obtained in Example 1 as isocyanide ligand, 1.14 g (0.5 mmol) of both end trimethylsilyl-capped poly(dimethylsiloxane-methylhydrosiloxane) copolymer as hydrosiloxane, and 148 mg (1.3 mmol) of allyl glycidyl ether, which were stirred at 80° C. for 24 hours. After cooling, the product was analyzed by $^1$H-NMR spectroscopy to determine its yield. As a result, the yield was 18%.

Example 74

A reactor was charged with 5.7 mg (0.01 mmol) of Cobalt carboxylate E obtained in Synthesis Example 9, 10.9 mg (0.03 mmol) of Isocyanide L-1 obtained in Example 1 as isocyanide ligand, 1.14 g (0.5 mmol) of both end trimethylsilyl-capped poly(dimethylsiloxane-methylhydrosiloxane) copolymer as hydrosiloxane, and 148 mg (1.3 mmol) of allyl glycidyl ether, which were stirred at 80° C. for 24 hours. After cooling, the product was analyzed by $^1$H-NMR spectroscopy to determine its yield. As a result, the yield was 50%.

(11) Reaction of Hydrosiloxane with Vinylsiloxane

[Chem. 16]

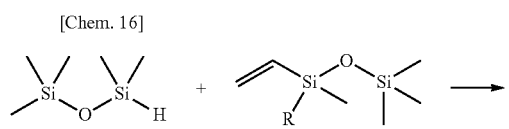

-continued

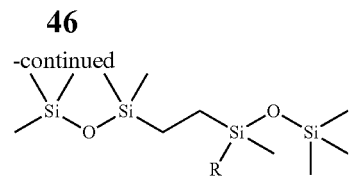

Example 75

A reactor was charged with 2.6 mg (0.01 mmol) of cobalt pivalate obtained in Synthesis Example 2, 10.9 mg (0.03 mmol) of Isocyanide L-1 obtained in Example 1 as isocyanide ligand, 192 mg (1.3 mmol) of 1,1,1,3,3-pentamethyldisiloxane as hydrosiloxane, and 174 mg (1 mmol) of 1-vinyl-1,1,3,3,3-pentamethyldisiloxane, which were stirred at 80° C. for 24 hours. After cooling, the product was analyzed by $^1$H-NMR spectroscopy to determine its yield. As a result, the yield was 22%.

Example 76

A reactor was charged with 2.6 mg (0.01 mmol) of cobalt pivalate obtained in Synthesis Example 2, 10.9 mg (0.03 mmol) of Isocyanide L-1 obtained in Example 1 as isocyanide ligand, 289 mg (1.3 mmol) of 1,1,1,3,5,5,5-heptamethyltrisiloxane as hydrosiloxane, and 174 mg (1.0 mmol) of 1-vinyl-1,1,3,3,3-pentamethyldisiloxane, which were stirred at 80° C. for 24 hours. After cooling, the product was analyzed by $^1$H-NMR spectroscopy to determine its yield. As a result, the yield was 21%.

(12) Reaction of Pentamethyldisiloxane with Styrene

[Chem. 17]

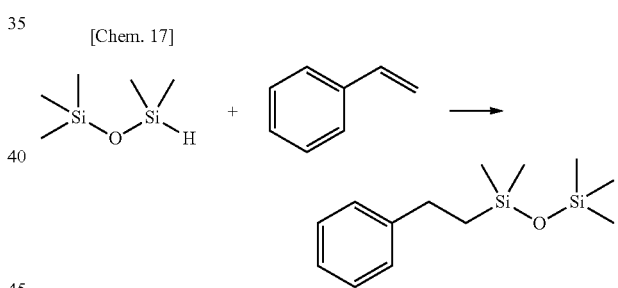

Example 77

A reactor was charged with 8.7 mg (0.01 mmol) of Iron carboxylate A obtained in Synthesis Example 14, 7.3 mg (0.02 mmol) of Isocyanide L-1 obtained in Example 1 as isocyanide ligand, 192 mg (1.3 mmol) of 1,1,1,3,3-pentamethyldisiloxane as hydrosiloxane, and 104 mg (1.0 mmol) of styrene, which were stirred at room temperature for 3 hours. After cooling, the product was analyzed by $^1$H-NMR spectroscopy to determine its yield. As a result, the yield was 88%.

Example 78

A reactor was charged with 113 mg (0.20 mmol) of Iron carboxylate C obtained in Synthesis Example 16, 295 mg (0.81 mmol) of Isocyanide L-1 obtained in Example 1 as isocyanide ligand, 7.75 g (52 mmol) of 1,1,1,3,3-pentamethyldisiloxane as hydrosiloxane, and 4.16 g (40 mmol) of styrene, which were stirred at 50° C. for 6 hours. After cooling, the product was analyzed by ¹H-NMR spectroscopy to determine its yield. As a result, the yield was 90%.

Example 79

A reactor was charged with 68 mg (0.20 mmol) of iron 2-ethylhexanoate obtained in Synthesis Example 17, 295 mg (0.81 mmol) of Isocyanide L-1 obtained in Example 1 as isocyanide ligand, 7.75 g (52 mmol) of 1,1,1,3,3-pentamethyldisiloxane as hydrosiloxane, and 4.16 g (40 mmol) of styrene, which were stirred at 50° C. for 6 hours. After cooling, the product was analyzed by ¹H-NMR spectroscopy to determine its yield. As a result, the yield was 94%.

Example 80

A reactor was charged with 3.5 mg (0.01 mmol) of iron trifluoromethanesulfonate (Aldrich), 7.3 mg (0.02 mmol) of Isocyanide L-1 obtained in Example 1 as isocyanide ligand, 192 mg (1.3 mmol) of 1,1,1,3,3-pentamethyldisiloxane as hydrosiloxane, and 104 mg (1.0 mmol) of styrene, which were stirred at 50° C. for 24 hours. After cooling, the product was analyzed by ¹H-NMR spectroscopy to determine its yield. As a result, the yield was 23%.

(13) Reaction of Various Hydrosilanes with α-Methylstyrene

[Chem. 18]

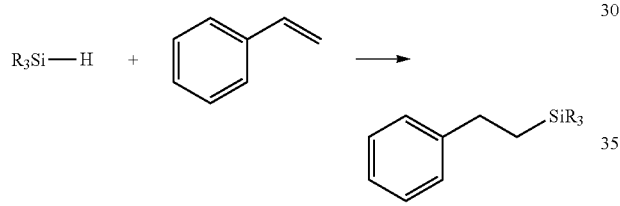

Example 81

A reactor was charged with 7.7 mg (0.03 mmol) of iron pivalate obtained in Synthesis Example 1, 22 mg (0.06 mmol) of Isocyanide L-1 obtained in Example 1 as isocyanide ligand, 214 mg (1.3 mmol) of triethoxysilane as hydrosiloxane, and 104 mg (1.0 mmol) of styrene, which were stirred at 80° C. for 3 hours. After cooling, the product was analyzed by ¹H-NMR spectroscopy to determine its yield. As a result, the yield was 8%.

Example 82

A reactor was charged with 2.6 mg (0.01 mmol) of iron pivalate obtained in Synthesis Example 1, 7.3 mg (0.02 mmol) of Isocyanide L-1 obtained in Example 1 as isocyanide ligand, 1.07 g (0.50 mmol) of both end hydrodimethylsilyl-capped polydimethylsiloxane (average DOP 27) as hydrosiloxane, and 135 mg (1.3 mmol) of styrene, which were stirred at 50° C. for 3 hours. After cooling, the product was analyzed by ¹H-NMR spectroscopy to determine its yield. As a result, the yield was 75%.

Example 83

A reactor was charged with 6.7 mg (0.01 mmol) of Iron carboxylate B obtained in Synthesis Example 15, 7.3 mg (0.02 mmol) of Isocyanide L-1 obtained in Example 1 as isocyanide ligand, 1.07 g (0.50 mmol) of both end hydrodimethylsilyl-capped polydimethylsiloxane (average DOP 27) as hydrosiloxane, and 135 mg (1.3 mmol) of styrene, which were stirred at 50° C. for 24 hours. After cooling, the product was analyzed by ¹H-NMR spectroscopy to determine its yield. As a result, the yield was 20%.

Example 84

A reactor was charged with 5.7 mg (0.01 mmol) of Iron carboxylate C obtained in Synthesis Example 16, 7.3 mg (0.02 mmol) of Isocyanide L-1 obtained in Example 1 as isocyanide ligand, 1.07 g (0.50 mmol) of both end hydrodimethylsilyl-capped polydimethylsiloxane (average DOP 27) as hydrosiloxane, and 135 mg (1.3 mmol) of styrene, which were stirred at 50° C. for 24 hours. After cooling, the product was analyzed by ¹H-NMR spectroscopy to determine its yield. As a result, the yield was 84%.

Example 85

A reactor was charged with 56.9 mg (0.10 mmol) of Cobalt carboxylate E obtained in Synthesis Example 9, 217.8 mg (0.60 mmol) of Isocyanide L-1 obtained in Example 1 as isocyanide ligand, 48.3 mg (0.30 mmol) of 1-cyanoadamantane, 14.43 g (65.0 mmol) of 1,1,1,3,5,5,5-heptamethyltrisiloxane as hydrosiloxane, and 5.60 g (50.0 mmol) of 1-octene, which were stirred at 80° C. for 4 hours. After cooling, the product was analyzed by ¹H-NMR spectroscopy to determine its yield. The GC yield was 71.7% as analyzed by gas chromatography.

The invention claimed is:

1. An isocyanide compound having the formula (1) or (1)':

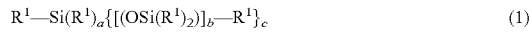

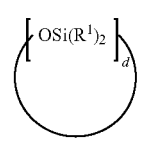

in formula (1) or (1)', $R^1$ is each independently a monovalent organic group selected from optionally substituted alkyl, alkoxy, alkenyl, alkynyl, aryl, and aralkyl groups of 1 to 30 carbon atoms which may be separated by at least one atom selected from oxygen, nitrogen, sulfur and phosphorus, and groups having the formula (2):

-A-NC  (2)

wherein A is an optionally substituted divalent organic group of 1 to 30 carbon atoms which may be separated by at least one atom selected from silicon, oxygen, nitrogen, sulfur and phosphorus, one, two or three of all $R^1$ groups being an organic group of formula (2), a is 0, 1 or 2, c is 1, 2 or 3, a+c is equal to 3, b is an integer of 1 to 300, and d is an integer of 3 to 20.

2. The isocyanide compound of claim 1 wherein one of all $R^1$ groups in formula (1) or (1)' is an organic group of formula (2).

3. A hydrosilylation reaction catalyst which is the reaction product of a metal salt compound having the formula (3) and an isocyanide compound having the formula (1) or (1)',

in formula (3), M is a transition metal of Group 8, 9 or 10 in the Periodic Table exclusive of platinum, X is a halogen atom, L is at least one monovalent organic group selected from the following formulae (4) to (6), e is an integer of 1 or 2, f is an integer of 0 to 6, g is an integer of 0 to 3, f+g is equal to 2 or 3 when e=1, and f+g is equal to 4 to 6 when e=2, $$—O—R^2 \quad (4)$$

$$—OCO—R^2 \quad (5)$$

$$—OSO_2—R^2 \quad (6)$$

in formulae (4) to (6), $R^2$ is each independently an optionally substituted monovalent organic group of 1 to 30 carbon atoms which may be separated by at least one atom selected from oxygen, nitrogen, sulfur and phosphorus, or a monovalent organic group having the formula (7):

$$—(B)_p R^3 \quad (7)$$

wherein B is an optionally substituted divalent organic group of 1 to 30 carbon atoms which may be separated by at least one atom selected from oxygen, nitrogen, sulfur and phosphorus, p is an integer of 0 or 1, p is 0 or 1 when L is a monovalent organic group of formula (4), and p is 1 when L is a monovalent organic group of formula (5) or (6), $R^3$ is a group having the formula (8):

$$—\{Si(R^5)_2—R^4\}_h—Si(R^5)_l\{[(OSi(R^5)_2)]_m—R^5\}_n \quad (8)$$

wherein $R^4$ is an optionally substituted divalent organic group of 1 to 10 carbon atoms which may be separated by at least one oxygen atom, $R^5$ is an optionally substituted alkyl, alkoxy, aryl or aralkyl group of 1 to 30 carbon atoms which may be separated by at least one atom selected from oxygen, nitrogen, sulfur and phosphorus, h is an integer of 0 or 1, l is an integer of 0 to 3, m is an integer of 1 to 300, n is an integer of 0 to 3, l+n is equal to 3, $$R^1—Si(R^1)_a\{[(OSi(R^1)_2)]_b—R^1\}_c \quad (1)$$

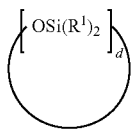  (1)' in formula (1) or (1)', $R^1$ is each independently a monovalent organic group selected from optionally substituted alkyl, alkoxy, alkenyl, alkynyl, aryl, and aralkyl groups of 1 to 30 carbon atoms which may be separated by at least one atom selected from oxygen, nitrogen, sulfur and phosphorus, and groups having the formula (2):

$$-A-NC \quad (2)$$

wherein A is an optionally substituted divalent organic group of 1 to 30 carbon atoms which may be separated by at least one atom selected from silicon, oxygen, nitrogen, sulfur and phosphorus, one, two or three of all $R^1$ groups being an organic group of formula (2), a is 0, 1 or 2, c is 1, 2 or 3, a+c is equal to 3, b is an integer of 1 to 300, and d is an integer of 3 to 20.

4. The hydrosilylation reaction catalyst of claim 3 wherein one of all $R^1$ groups in formula (1) or (1)' is an organic group of formula (2).

5. The hydrosilylation reaction catalyst of claim 3 which is prepared for effecting a hydrosilylation reaction between (i) compound having an aliphatic unsaturated bond and (ii) a hydrosilane compound or organohydro(poly)siloxane compound having a Si—H group.

6. The hydrosilylation reaction catalyst of claim 3 wherein M is Fe, Co or Ni, e is 1, f is 2, and g is 0.

7. The hydrosilylation reaction catalyst of claim 3 wherein M is Rh, e is 2, f is 4, and g is 0.

8. The hydrosilylation reaction catalyst of claim 3 wherein M is Ru, e is 2, f is 4, and g is 1.

9. The hydrosilylation reaction catalyst of claim 3 wherein L is a monovalent organic group of formula (5).

10. The hydrosilylation reaction catalyst of claim 9 wherein $R^2$ is an optionally halo-substituted alkyl group of 1 to 5 carbon atoms.

11. A method for preparing a hydrosilylation reaction catalyst according to claim 3, comprising the step of reacting a metal salt compound of formula (3) with an isocyanide compound of formula (1) or (1)', comprising (i) a compound having an aliphatic unsaturated bond and (ii) a hydrosilane compound or organohydro(poly)siloxane compound having a Si—H group.

12. A method for preparing an addition compound comprising the step of effecting hydrosilylation reaction of a compound having an aliphatic unsaturated bond with a hydrosilane compound or organohydro(poly)siloxane compound having a Si—H bond in the presence of the hydrosilylation reaction catalyst of claim 3.

13. The method for preparing an addition compound of claim 12 wherein the compound having an aliphatic unsaturated bond is an olefin compound, or a silane compound or organo(poly)siloxane having an alkenyl group.

14. A method for preparing an addition compound comprising the steps of:

preparing a hydrosilylation reaction catalyst from a metal salt of formula (3) and an isocyanide compound of formula (1) or (1)', as set forth in claim 3, in a system for effecting hydrosilylation reaction between a compound having an aliphatic unsaturated bond and a hydrosilane compound or organohydro(poly)siloxane compound having a Si—H group, and effecting the hydrosilylation reaction in the presence of the hydrosilylation reaction catalyst.

15. The method for preparing an addition compound of claim 14 wherein the compound having an aliphatic unsaturated bond is an olefin compound, or a silane compound or organo(poly)siloxane having an alkenyl group.

16. The isocyanide compound of claim 1, wherein $R^1$ is each independently a monovalent organic group selected from the groups consisting of $C_1$-$C_{30}$ monovalent hydrocarbon groups, alkoxy groups and groups having the formula (2).

17. The isocyanide compound of claim 1, wherein A is an optionally substituted divalent hydrocarbon group of 1 to 30 carbon atoms.

18. The isocyanide compound of claim 1, wherein A is a divalent hydrocarbon group selected from the groups consisting of $C_1$-$C_{20}$ alkylene groups, $C_6$-$C_{30}$ arylene groups and $C_7$-$C_{30}$ aralkylene groups.

19. The hydrosilylation reaction catalyst of claim 3, herein in formulae (1) and (1)', $R^1$ is each independently a monovalent organic group selected from the groups consisting of $C_1$-$C_{30}$ monovalent hydrocarbon groups, alkoxy groups and groups having the formula (2).

20. The hydrosilylation reaction catalyst of claim 3, wherein in formula (2), A is an optionally substituted divalent hydrocarbon group of 1 to 30 carbon atoms.

21. The hydrosilylation reaction catalyst of claim 3, wherein in formula (2), A is a divalent organic group selected from the groups consisting of $C_1$-$C_{20}$ alkylene groups, $C_6$-$C_{30}$ arylene groups and $C_7$-$C_{30}$ aralkylene groups.

* * * * *